US011301591B2

(12) United States Patent
Saileshwar et al.

(10) Patent No.: US 11,301,591 B2
(45) Date of Patent: Apr. 12, 2022

(54) SPECULATIVE INFORMATION FLOW TRACKING

(71) Applicant: Microsoft Technology Licensing, LLC, Redmond, WA (US)

(72) Inventors: Gururaj Saileshwar, Atlanta, GA (US); Muntaquim Chowdhury, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 30 days.

(21) Appl. No.: 16/669,027

(22) Filed: Oct. 30, 2019

(65) Prior Publication Data

US 2021/0064787 A1 Mar. 4, 2021

Related U.S. Application Data

(60) Provisional application No. 62/894,657, filed on Aug. 30, 2019.

(51) Int. Cl.
*H04L 29/06* (2006.01)
*G06F 21/75* (2013.01)
*G06F 21/54* (2013.01)

(52) U.S. Cl.
CPC .............. *G06F 21/75* (2013.01); *G06F 21/54* (2013.01); *G06F 2221/034* (2013.01)

(58) Field of Classification Search
CPC .... G06F 21/75; G06F 21/54; G06F 2221/034; G06F 21/71; G06F 21/556; G06F 21/70; G06F 21/72; G06F 21/50; G06F 2221/033; H04L 29/06
See application file for complete search history.

(56) References Cited

U.S. PATENT DOCUMENTS

| 6,484,254 | B1 | 11/2002 | Chowdhury et al. |
| 6,687,809 | B2 | 2/2004 | Chowdhury et al. |
| 6,708,269 | B1 | 3/2004 | Tiruvallur et al. |
| 10,929,141 | B1 * | 2/2021 | Kaplan ................ G06F 9/3834 |
| 2003/0088760 | A1 | 5/2003 | Chowdhury et al. |
| 2019/0147162 | A1 | 5/2019 | Mejbah Ul Alam et al. |

(Continued)

OTHER PUBLICATIONS

Barber, et al., "Isolating Speculative Data to Prevent Transient Execution Attacks," In Journal of IEEE Computer Architecture Letters, May 14, 2019, pp. 1-4.

(Continued)

*Primary Examiner* — Quazi Farooqui
(74) *Attorney, Agent, or Firm* — Klarquist Sparkman, LLP

(57) ABSTRACT

Apparatus and methods are disclosed for processors that associate a taint-source operation with another operation dependent upon the taint-source operation, perform the taint-source operation thereby causing a side effect, and suppress the side effect of the taint-source operation until conditional state determining commitment of the taint-source operation is resolved. In some examples, the method can further include associating a speculation-source operation with the taint-source operation, storing taint data in taint-matrix memory associating the speculation-source operation, the taint-source operation, and/or the taint-dependent operation, and performing the suppressing of side effects based on the stored taint data.

22 Claims, 20 Drawing Sheets

(56) References Cited

U.S. PATENT DOCUMENTS

2019/0205142 A1 7/2019 Ghosh
2021/0081575 A1 3/2021 Saileshwar et al.

OTHER PUBLICATIONS

Barber, et al., "SpecShield: Shielding Speculative Data from Microarchitectural Covert Channels," In Proceedings of $28^{th}$ International Conference on Parallel Architectures and Compilation Techniques, Sep. 23, 2019, 14 pages.
Kocher, et al., "Spectre Attacks: Exploiting Speculative Execution," In Proceedings of IEEE Symposium on Security and Privacy, May 19, 2019, pp. 1-19.
Li, et al., "Conditional Speculation: An Effective Approach to Safeguard Out-of-Order Execution Against Spectre Attacks," In Proceedings of IEEE International Symposium on High Performance Computer Architecture, Feb. 16, 2019, pp. 264-276.
Sakalis, et al., "Efficient Invisible Speculative Execution Through Selective Delay and Value Prediction," In Proceedings of 46th International Symposium on Computer Architecture, Jun. 22, 2019, pp. 723-735.
Wang, et al., "Covert and Side Channels due to Processor Architecture," In Proceedings of the 22nd Annual Computer Security Applications Conference, Dec. 11, 2006, pp. 473-482.
Weisse, et al., "NDA: Preventing Speculative Execution Attacks at Their Source," In Proceedings of the $52^{nd}$ Annual IEEE/ACM International Symposium on Microarchitecture, Oct. 12, 2019, pp. 572-586.
Koruyeh, et al., "SPECCFI: Mitigating Spectre Attacks using CFI Informed Speculation", In repository of arXiv:1906.01345, Jun. 4, 2019, 15 Pages.
Li, et al., "Online Detection of Spectre Attacks Using Microarchitectural Traces from Performance Counters", In Proceedings of International Symposium on Computer Architecture and High Performance Computing, Sep. 24, 2018, pp. 25-28.
"International Search Report and Written Opinion Issued in PCT Application No. PCT/US20/038021", dated Sep. 29, 2020, 11 Pages.
"International Search Report and Written Opinion Issued in PCT Application No. PCT/US20/037982". dated Sep. 23, 2020, 11 Pages.
Fustos, et al., "SpectreGuard: An Efficient Data-Centric Defense Mechanism Against Spectre Attacks", In Proceedings of the 56th Annual Design Automation Conference, Jun. 2, 2019, 6 Pages.

* cited by examiner

⓪ Branch

① R1 <= L1[Imm]

② R2 <= Add(R1, Imm)

③ R3 <= L2[R2]

④ R4 <= L3[R3]

SPECULATIVE INFORMATION FLOW TRACKING

CROSS-REFERENCE TO RELATED APPLICATIONS

This application claims the benefit of U.S. Provisional Application No. 62/894,657, filed Aug. 30, 2019, which application is incorporated herein by reference in its entirety.

BACKGROUND

Attacks like Spectre and Meltdown exploit vulnerabilities in processors resulting from side effects of speculative execution when performing branch prediction. These vulnerabilities affect hundreds of millions of computers in data centers, mobile devices, laptops, and other computers. These attacks can leak sensitive data by exploiting processor speculation to access secrets and transmitting them through speculative changes to the processor caches. Such attacks are extremely potent, having broken software-based abstractions of trust like process-isolation, intra-process sandboxing and even trusted hardware-enclaves (e.g., Intel SGX). Thus, there is ample opportunity for improvement in techniques to mitigate these attacks.

SUMMARY

Apparatus and methods are disclosed for Speculative Information Flow Tracking (SIFT) processors configured to associate a taint-source operation with another operation dependent upon the taint-source operation, perform the taint-source operation thereby causing a side effect, and suppress the side effect of the taint-source operation until conditional state determining commitment of the taint-source operation is resolved. In some examples, the method can further include associating a speculation-source operation with the taint-source operation, storing taint data in memory associating the speculation-source operation, the taint-source operation, and/or the taint-dependent operation, and perform the suppression of side effects based on the stored taint data.

In one particular example, side effects that can lead to side channel attacks can be averted by identifying a conditional branch instruction, monitoring memory load instructions that speculatively execute based on a prediction for the conditional branch instruction using a speculation shadow buffer, and marking destination registers as being tainted by the speculatively-executed memory load instructions. Storage, e.g., a taint matrix, stores associations between the speculatively-executed memory load instructions and tainted registers. Transfer of data to the destination registers from memory load, branches, or other types of instructions susceptible to such side channel vulnerabilities can be delayed until the conditional branch instruction resolves. Subsequently, the associations in the taint matrix are cleared and register operations previously marked as tainted are allowed to complete.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The foregoing and other aspects and features of the disclosed technology will become more apparent from the following detailed description, which proceeds with reference to the accompanying figures.

DETAILED DESCRIPTION

I. General Considerations

Figure 1:
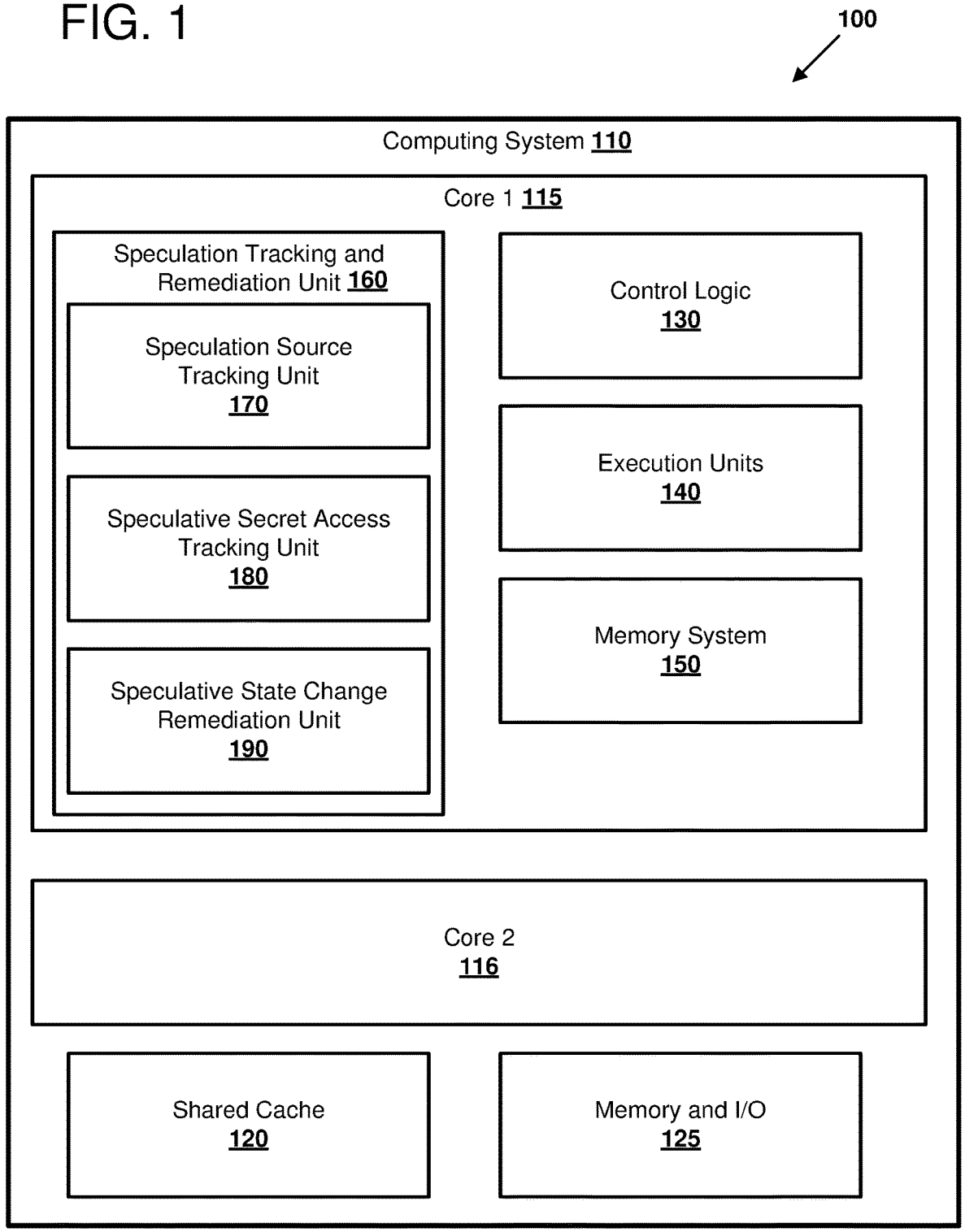
FIG. 1 illustrates an example computing system in which certain methods of speculation tracking and remediation can be performed.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "verify," "execute," "perform," "convert," "suppress," "mitigate," and "initiate" to describe the disclosed methods. These terms are high-level descriptions of the actual operations that are performed. The actual operations that correspond to these terms will vary depending on the particular implementation and are readily discernible by one of ordinary skill in the art having the benefit of the present disclosure.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., computer-readable storage media). The computer-executable instructions can be part of, for example, a dedicated software application or a software application that is accessed or downloaded via a web browser or other software application (such as a remote computing application). Such software can be executed, for example, on a single local computer or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

II. Introduction to the Disclosed Technology

Speculative execution is used in many modern processors to avoid control flow or data dependency stalls. However, in the event of mis-speculation, illegal access to secret data may be transiently allowed. Side channel attacks, for example, based on latency difference on cache hits or misses, may leak data to an attacker. Apparatus and methods disclosed herein can be used to address such speculative side channel attacks by identifying sources of speculation, monitoring speculative execution, and remediating side effects of speculative execution until a speculation-source operation associated with the speculative execution is resolved. As used herein, the term "speculation-source operation" refers to an operation that speculation can be based on. For example, branch instructions introduce a control flow conditional and taint-source operation, based on whether the branch is take or not taken, can proceed speculatively prior to the speculation-source operation being resolved (e.g., whether the branch is taken or the branch location is resolved). As another example, store address calculation is an example of a speculation-source operation (as used in this application) because a taint-source operation may proceed prior to the calculation of the store address. By associating speculative sources with associated side effect targets, taint-source operations associated with a vulnerability may be suppressed, while other operations can be allowed to proceed. This can result in a significant performance improvement over an approach that delays all operations having such side effects.

For example, in the case of speculative L1-cache misses, only a small fraction of loads are dependent on speculative data and hence capable of potentially leaking any information. Thus, with fine-grain tracking of speculative data usage, it is possible to classify a large fraction of speculative L1-misses as "safe", which can thus be executed with no blocking, allowing higher performance without compromising security.

The examples disclosed herein mostly focus on control flow speculation that is used to attack a side channel of a data cache. However, as will be readily understood to one of ordinary skill in the relevant art having the benefit of the present disclosure, the disclosed techniques can be applied to number of different speculation sources and side channel attacks. Examples of sources of speculation that can be addressed using disclosed methods and apparatus include control flow speculation, data flow speculation, memory consistency, and exception checking. Examples of side channels that can be remediated from attack based on such speculation sources can include side channel leakage involving data cache, multithreaded port attacks, translation lookaside buffer (TLB) lookups, instruction cache, use of vector instructions, and branch target buffer attacks. As used herein, the term "operation" refers to not only architecturally-visible processor instructions (macro instructions), but can also include processor micro instructions, microcode, or other forms of operations performed by a processor.

III. Example Computer System

FIG. 1 is a block diagram 100 of an example computing system 110 in which certain examples of the disclosed technology can be implemented. The computing system 110 includes a processor having two processor cores 115 and 116 along with shared cache 120 and a memory and input/output unit 125. Further detail is illustrated for the first core 115; the second core 116 can have similar features. As shown, the first core 115 includes control logic 130 which controls operation of the execution units 140 and the processor core's memory system 150. The execution units 140 can include integer units, arithmetic and logic units, floating-point units, vector processing units, and other suitable data processing execution units. The memory system 150 can include logic implementing a cache and associated control logic. The control logic 130 includes an instruction scheduler that controls dispatch and issue of processor instructions to the execution units 140. The control logic 130 is also coupled to a speculation tracking and remediation unit 160. As shown, the speculation tracking and remediation unit 160 and includes three sub-control units: a speculation source tracking unit 170, a speculative secret access tracking unit 180, and a speculative state change remediation unit 190.

The computing system 110 and processor, including processor cores 115 and 116, can be implemented using any suitable computing hardware. For example, the computing system and/or processor can implemented with general-purpose CPUs and/or specialized processors, such as graphics processing units (GPUs) or tensor processing units (TPUs); application-specific integrated circuits (ASICs), or programmable/reconfigurable logic, such as field programmable gate arrays (FPGAs) executing on any suitable commercially-available computer), or any suitable combination of such hardware. In some examples, the processor can be implemented as a virtual processor executing on a physical processor under control of a hypervisor. In some examples, the processor can be implemented using hardware or software emulation to execute at least some instructions formatted in a different instruction set architecture than the native instruction set of the host processor providing instruction emulation.

Any suitable technology can be used to implement the control logic 130. The control logic 130 can be configured to regulate one or more aspects of processor control, including regulating execution of processor instructions through various stages of execution (e.g., fetch, decode, dispatch, issue, execution, writeback, and commit), controlling operation of datapath, execution units, and memory. The control logic 130 can regulate not only architecturally-visible operations, but also can regulate microarchitectural operations that are typically not intended to be programmer-visible, including speculative execution (e.g., of conditional branches, memory loads, or memory address calculations) out of order issue, register allocation and renaming, superscalar operation, translation of macro instructions into micro instructions, fusion of macro or micro operations, cache and memory access, branch prediction, address generation, store forwarding, instruction reordering, and any other suitable microarchitectural operation.

The control logic 130 may be implemented with "hardwired logic," such as a finite state machine implemented with a combination of combinatorial and sequential logic gates (e.g., in a random logic design style implemented as a Moore or Mealy machine) or as programmable logic (e.g., a programmable logic array or other reconfigurable logic); or as a microprogrammed controller or microcode processor that executes microinstructions stored in a microcode memory (implemented as volatile memory (e.g., registers, static random access memory (SRAM), dynamic random access memory DRAM), non-volatile memory (e.g., read only memory (ROM), programmable read only memory (PROM), electrically erasable programmable memory (EEPROM), flash memory, etc.), or some combination of volatile and non-volatile memory types. The control logic 130 generally operates by accepting input signals (e.g., by receiving at least one digital value), processing the input signals taking into account a current state sequential elements of the control logic, and producing output signals (e.g., by producing at least one digital value) that are used to control other components of the processor, for example, logic components, datapath components, execution units, memories, and/or input/output (I/O) components. The current state of the control logic is updated to a new state based on input signals and current state. Values representing the state of the control logic can be store in any suitable storage device or memory, including latches, flip-flops, registers, register files, memory, etc. In some examples, the control logic is regulated by one or more clock signals that allow for processing of logic values synchronously, according to a clock signal edge or signal level. In other examples, at least a portion of the control logic can operate asynchronously.

The speculation tracking and remediation unit 160 acts in concert with the control logic 130 in order to identify sources of speculative execution in the processor, monitor taint-source operations, track instructions that access processor resources in a speculative fashion based on associated sources of speculative execution, and remedy side effects of such speculative execution in order to reduce or eliminate risk of side channel attacks induced by speculative execution. In particular, the speculation tracking and remediation unit 160 can associate speculation sources with associated taint-source operations and use these associations in order to selectively remediate side effects of associated operations, and without forcing entire classes of operations to be delayed or otherwise affected by remediation measures. The speculation tracking and remediation unit 160 and its sub-components 170, 180, and 190 can be implemented using similar hardware components as the control logic 130, as described above. In some examples, some or all of the hardware components used to implement the control logic are shared or overlap with the hardware components used to implement the speculation tracking and remediation unit 160, while in other examples, separate hardware components may be used.

In further detail, the speculation source tracking unit 170 can identify and monitor one or more of a number of different types of operations, including, for example: a control flow operation, a data flow operation, a branch operation, a predicated operation, a memory store address calculation, a memory consistency operation, a compound atomic operation, a flag control operation, a transactional operation, or an exception operation. Specific examples of control flow operations include branch instructions such as relatively-addressed branches and absolute addressed jump instructions. As another example, memory address calculation operations, for example calculation of memory addresses for memory store instructions, are another example of a speculation source that can be tracked by the tracking unit 170. In some examples, a speculation shadow buffer can be used to track sources of speculation.

The speculative secret access tracking unit 180 identifies processor operations that can be at least partially executed in a speculative fashion based on an identified speculation the source. For example, memory operations such as those performed when executing memory load or memory store instructions can be speculatively executed before a speculation-source operation identified by the speculation source tracking unit 170 has completed. A specific example of a taint-source operation is a memory array read operation. Other examples of types of taint-source operations that can be performed prior to resolving a speculation source include: a memory load operation, a memory store operation, a memory array read operation, a memory array write operation, a memory store forwarding operation, a memory load forwarding operation, a branch instruction (including relatively-addressed or absolutely-addressed control flow changes), a predicated instruction, an implied addressing mode operation, an immediate addressing mode operation, a register addressing mode memory operation, an indirect register addressing mode operation, an automatically indexed (e.g., an automatically incremented or decremented addressing mode operation), a direct addressing mode operation, an indirect addressing mode operation, an indexed addressing mode operation, a register based indexed addressing mode operation, a program counter relative addressing mode operation, or a base register addressing mode operation. In some examples, a taint matrix is used to track taint-source operations. In some examples, entries and a speculation shadow buffer are associated with entries in the taint matrix in order to track specific sources of potentially harmful speculation side effects.

The speculative state change remediation unit 190 acts to remedy undesired side effects of speculative execution. For example, identified side effects of taint-source operations can be delayed or otherwise hidden from the programmer until its associated speculation-source operation is resolved. A specific example of remediation that can occur is delaying dispatch or issue of instructions affected by speculative execution. However, the types of remediation are not limited to delay of dispatch or issue. For example, a remediated instruction may be delayed at another stage in the process or pipeline, for example, earlier, at the fetch or dispatch stage, or later, at the execution, write back, or commit stage. Examples of processor components that can be remediated by a particular speculative state change remediation unit 190 include: a data cache of the processor, an instruction cache of the processor, a register read port of the processor, a register write port of the processor, a memory load port of the processor, a memory store port of the processor, symmetric multi-threading logic of the processor, a translation lookaside buffer of the processor, a vector processing unit of the processor, a branch target history table of the processor, or a branch target buffer of the processor.

IV. Example Computing System

Figure 2:
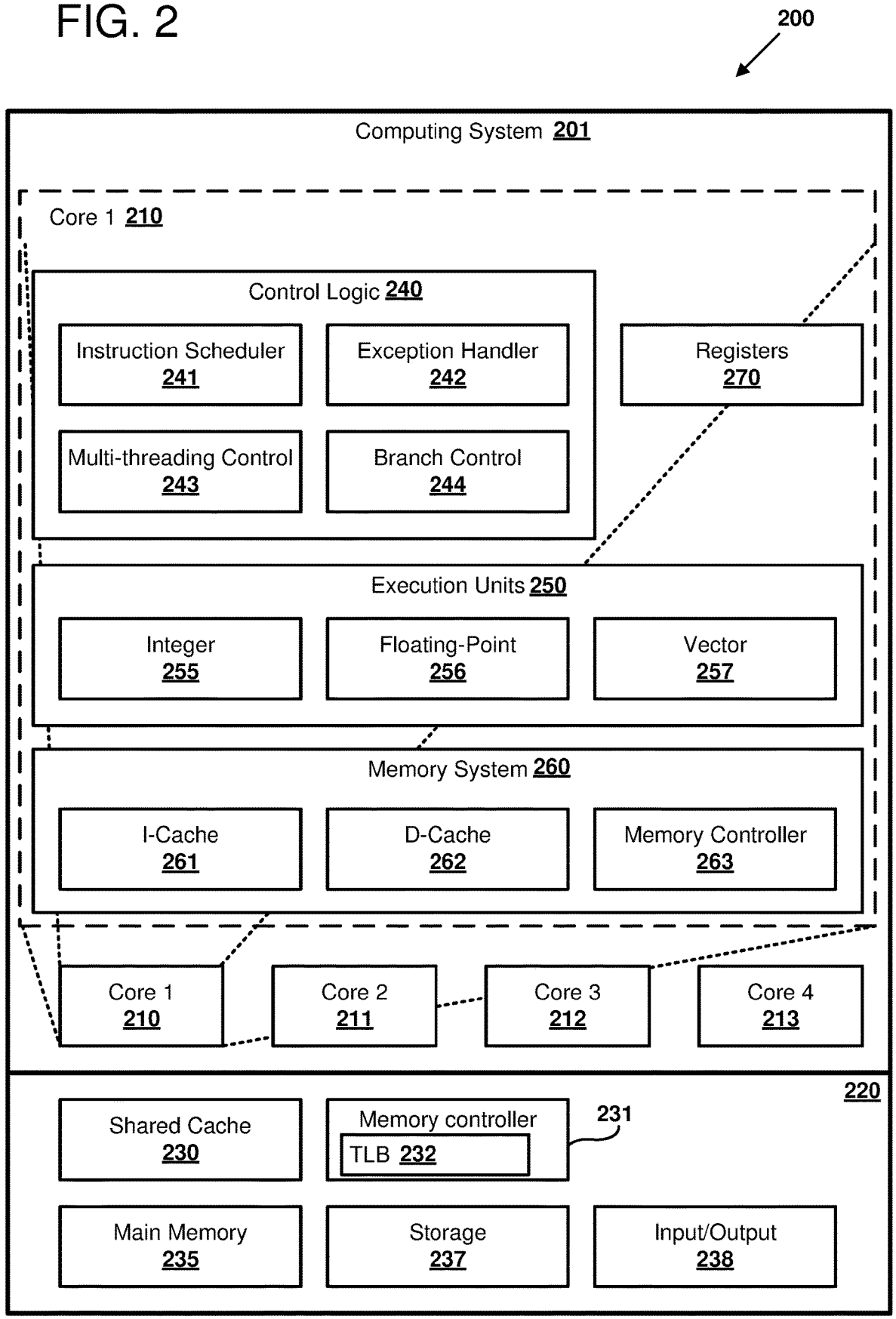
FIG. 2 illustrates a multicore computing system in which certain examples of speculation tracking and remediation can be performed.

FIG. 2 is a block diagram 200 outlining an example computing system 201 in which certain examples of the disclosed technology can be implemented. In the illustrated computing system 201, a processor including four cores 210, 211, 212, and 213 is illustrated. Each of the cores 211-213 can communicate with each other as well as with a shared logic portion 220. This shared logic system 220 includes shared cache 230, a memory controller 231 comprising a translation lookahead buffer (TLB) 232, main memory 235, storage 237, and input/output 238. The shared cache 230 can be, for example an L2 or L3 cache which stores data accessed from the main memory 235. The memory controller 231 uses the TLB 232 to translate logical addresses to physical addresses used to access the shared cache 230 and/or main memory 235. Additional forms of storage such as hard drive or flash memory can be used to implement the storage 237. The input/output 238 can be used to access peripherals or network resources, amongst other suitable input/output devices.

One of the cores, core 1 210, is illustrated in greater detail in FIG. 2. The other cores can have a similar or different composition as core 1 210. As shown, core 210 includes control logic 240 which controls operation of this particular processor core. The control logic 240 includes an instruction scheduler 241, which can control dispatch and issue of instructions to execution units 250. The control logic 240 further includes an exception handler 242 which can be used to process hardware- or software-based exceptions. The control logic 240 further includes multithreading control logic 243 which can be used to control access to resources when the processor core is operating in a multithreaded mode. The control logic also includes branch control logic 244 which controls evaluation and execution of branch instructions by the processor. For example, the branch control logic 244 can be used to evaluate and execute relative branch instructions, absolute branch instructions, and/or control operations of predicated instructions. In some examples, the branch control logic 244 includes a branch history table and a branch prediction unit. The branch history table and/or branch prediction unit can be used to generate predictions that enable taint-source operation of the processor. For example, the branch control logic 244 can predict that a particular branch instruction will be taken or not taken and speculatively execute additional instructions within an instruction window based on the prediction. In some examples, the branch predictions are associated with particular instructions in the instruction window. In other examples, the branch predictions are based on a running statistic of whether branches have been taken or not taken within a certain number of instructions in an instruction window.

The execution units 250 are used to perform calculations when performing operations such as those operation specified by processor instructions. In the illustrated example, the execution units 250 include an integer execution unit 255, a floating-point execution unit 256, and a vector execution unit 257. The integer execution unit can be used to perform integer arithmetic operations such as addition, subtraction, multiplication, or division, shift and rotate operations, or other suitable integer arithmetic operations. In some examples, the integer execution unit 255 includes an arithmetic logic unit (ALU). The floating-point execution unit 256 can perform single, double, or other precision floating-point operations. The vector execution unit 257 can be used to perform vector operations, for example single instruction multiple data (SIMD) instructions according to a particular set of vector instructions. Examples of vector instructions include, but are not limited to, Intel SSE, SSE2, AVX, and AVX2 instruction sets; ARM Neon, SVE, and SVE2 instruction sets; PowerPCT AltiVec instruction set; and certain vector examples of GPM instruction sets by NVIDIA and others.

The processor core 210 further includes a memory system 260 including an instruction cache 261, data cache 262, and a memory controller 263. The instruction cache can be used to store instructions fetched from the shared logic portion 220. Similarly, the data cache can store source operands for operations performed by the processor core and can also access memory via the memory controller in the shared logic resources 220. The memory controller 263 can regulate operation of the instruction cache 261 and data cache 262. The processor core further includes a register file 270 that stores programmer-visible architectural registers that are referenced by instructions executed by the processor. Architectural registers are distinguished from micoarchitectural registers in that the architectural registers are typically specified by the instruction set architecture of the processor, while microarchitectural registers store data that is used in performing the instructions, but is typically not programmer-visible.

The computing system 201, including individual cores 210-213, control logic 240, the memory controller 231, and other associated components, can be implemented using similar hardware components as the computing system 110, cores 115 and 116, control logic 130, and speculation tracking and remediation unit 160, as described in further detail above.

V. Example Remediation of Speculation Side Effects

Figure 3:
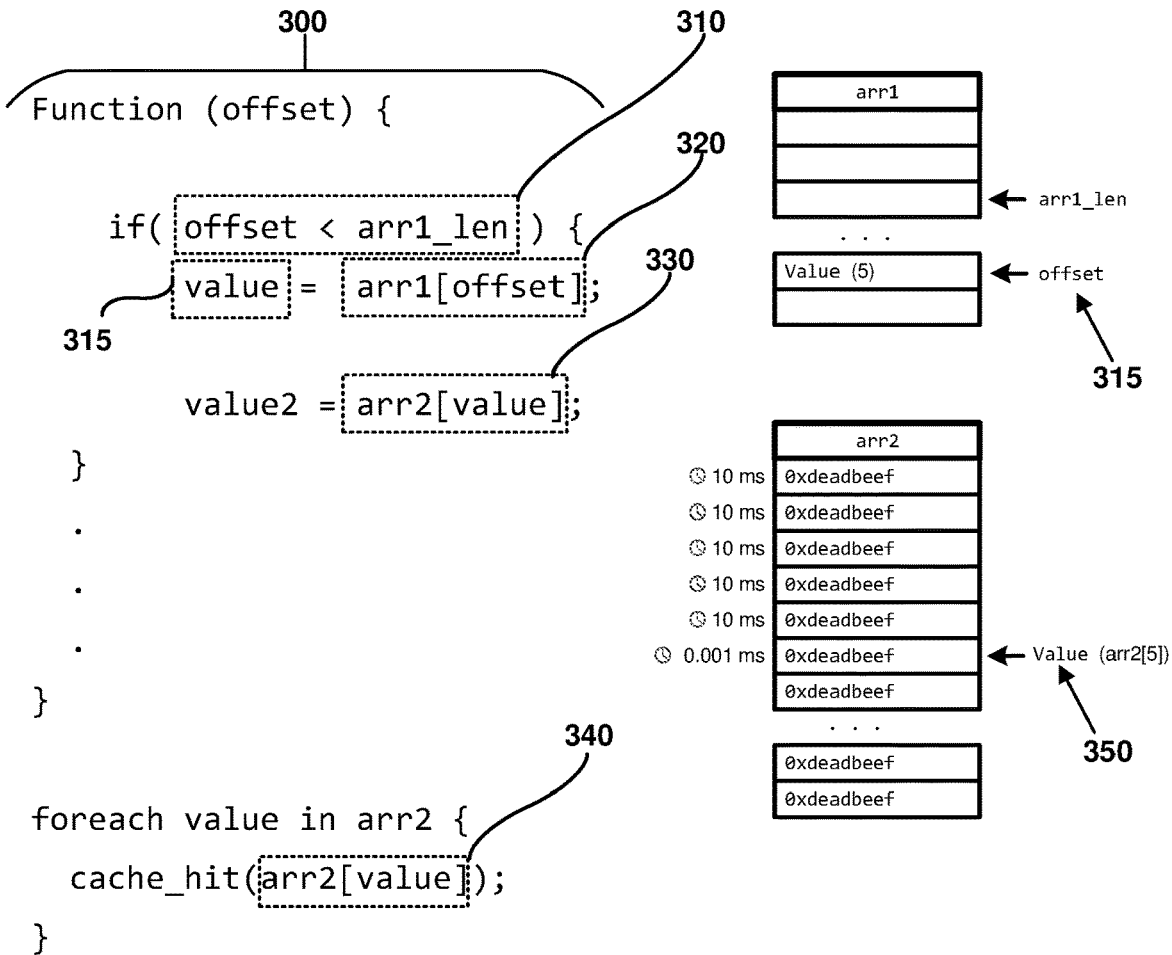
FIG. 3 illustrates an example of remediating a potential side channel cache attack, as can be performed in certain examples of the disclosed technology.
Figure 3:
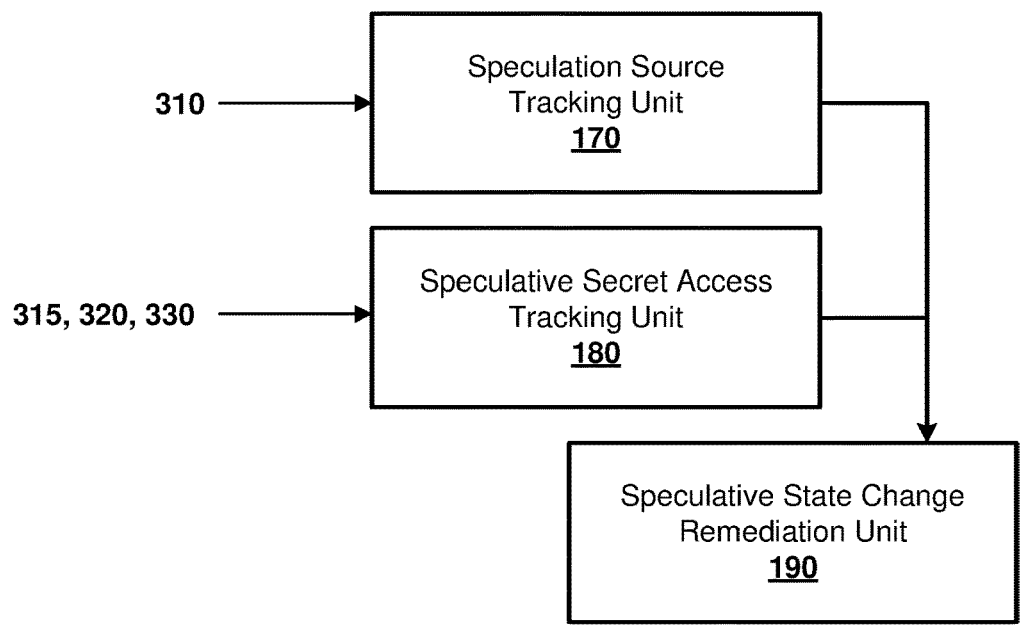

FIG. 3 illustrates an example of source code 300 that can be compiled and executed to present a vulnerability that can be remedied by certain examples of the disclosed technology. This source code 300 is an example of the Spectre-V1 exploit. When the code is executed, the comparison in the if statement condition creating the branch instruction 310 will execute as an array length check that causes a branch instruction to be executed by the processor running the code. Because the conditional may take some time to evaluate, the processor can speculatively execute instructions by predicting that the code inside the braces will execute. Thus, even if the value of the variable offset is greater than or equal to the array length, some of the instructions may be executed (but not committed) by the microarchitecture. Thus, speculative execution of the speculative array operation 320 (arr1 [offset]) will taint the destination register of the speculative load (value). The memory value stored at the out-of-bounds address arr1 [offset] could be a secret value created by another process. This can be exploited by an attacker. For example, if a load instruction uses a tainted register as an address for a subsequent load (arr2[value] 330), then subsequent accesses to that memory location will result in a cache hit. For example, after performing the speculative load to access secret data, additional code can be executed 340 to iterate and attempt a load for each value in the array arr2. The latency to access the values can be measured by an attacker using a timer. Thus, when the cache line hits at the offset 350 corresponding to the secret value (5), the latency of the cache will be greatly reduced. From this information, it can be deduced that the secret value is 5. Certain processors implemented according to the disclosed technology can be configured to track registers that have received data from tainted loads. The processor can be configured to propagate this taint as the speculative value is consumed by subsequent instructions and thereby taint destination registers of those instructions. Based on whether the register is tainted, the load is blocked in the instruction scheduler to prevent speculative cache state changes. The load can become unblocked after the original load, the tainted source, becomes non-speculative and the taint resolves. Thus, in the case of miss-speculation, no changes are visible in the cache based on tainted secrets, thereby preventing leakage of information from the cache.

FIG. 3 further shows how taint-source operations can be tracked by the processor. For example, using the speculation source tracking unit 170, speculation-source instructions such as the branch instruction 310 can be monitored to determine instructions that are executed speculatively based on the speculation-source operation as well as to determine when the taint-source operation condition is resolved. Similarly, the speculative secret access tracking unit 180 can track taint associated with taint-source operations 315, 320, and 330 so that spread of potentially tainted operations through the processor can be tracked as issue and execution proceed. Both units 170 and 180 can send signals to the speculative state change for mediation unit 190, which can determine how to address potential speculative access. For example, if it is determined that there is speculative access to tainted registers, the remediation unit can address this access by inhibiting dispatch, issue, or execution of tainted operations.

VI. Example Processor Microarchitecture

Figure 4:
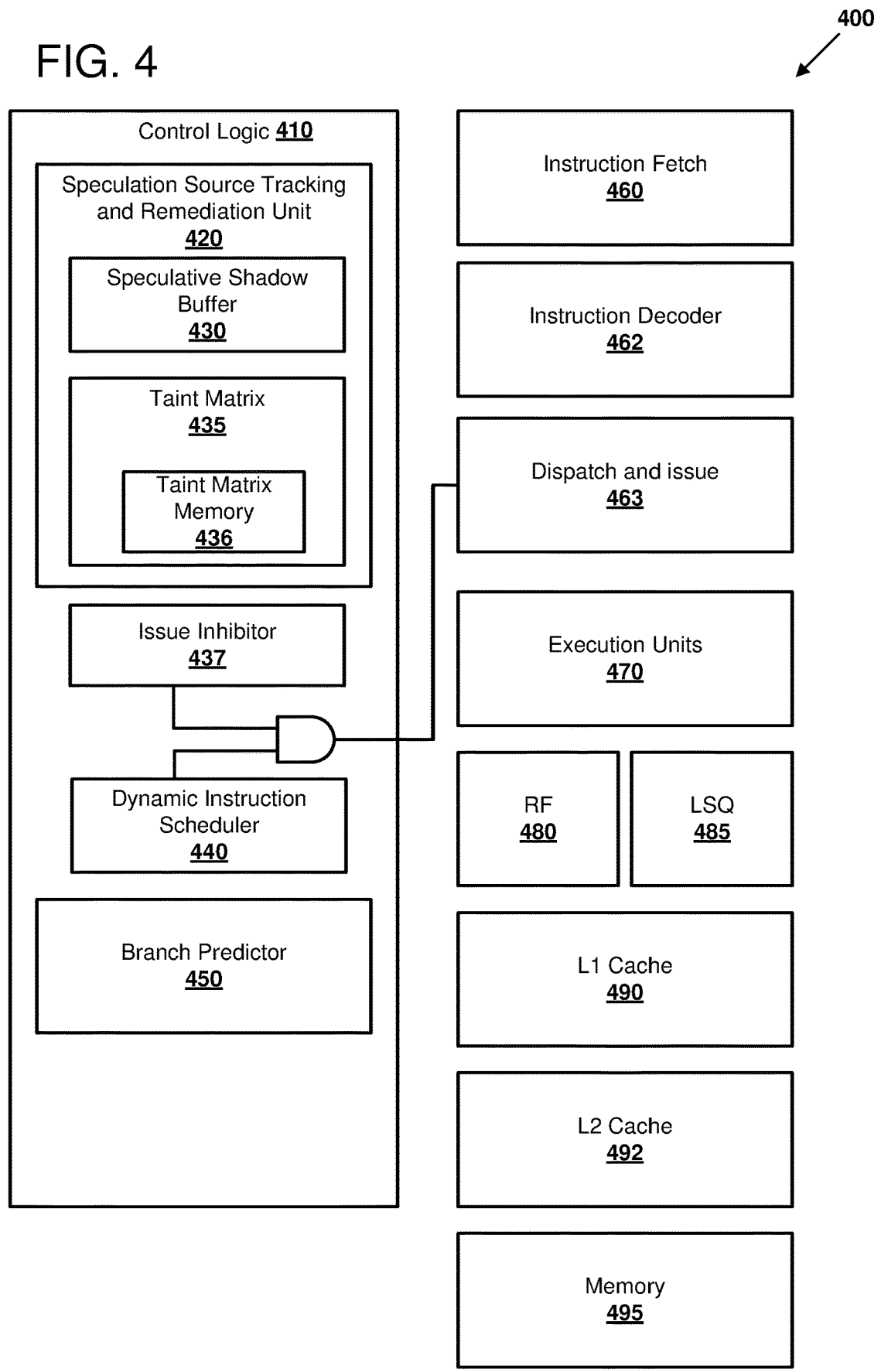
FIG. 4 illustrates a microarchitecture for using a speculation tracking and remediation unit, as can be implemented in certain examples of the disclosed technology.

FIG. 4 is a block diagram 400 outlining an example processor micro architecture in which certain examples of the disclosed technology can be implemented. As shown in FIG. 4, control logic 410 includes a speculation source tracking and remediation unit 420, which includes a speculative shadow buffer 430, a taint matrix 435, and an issue inhibitor 437. As will be discussed in further detail below, the speculative shadow buffer 430 can be used to identify and monitor speculation-source operations that can lead to taint-source operations. Registers and memory affected by speculative execution can be tracked using the taint matrix 435, which associates sources of taint-source operation in the speculative shadow buffer 430 with affected registers using the taint matrix 435. Based on the data in the speculative shadow buffer 430 and/or the taint matrix 435, logic in the issue inhibitor 437 can determine whether a taint-source instruction should be allowed to proceed through the processor pipeline. The taint-matrix includes a taint-matrix memory 436 that stores taint data. The taint-matrix memory is typically implemented as a register file or small memory that is accessible within the microarchitecture control but is not programmer-visible, other than by debug facilities or supervisor-privileged mode instructions. The control logic 410 further includes a dynamic instruction scheduler 440 which tracks instruction dependencies to determine when instructions can proceed to issue. The output of the dynamic instruction scheduler is combined with the output of the speculation source tracking and remediation unit 420 to generate a signal indicating whether particular instructions should proceed to dispatch, issue, and/or execution. As shown in FIG. 4, the control logic 410 further includes a branch predictor 450. The branch predictor 450 can monitor speculation-source operations performed by the processor to make predictions of whether branch instructions, as well as other suitable speculation-source instructions, will execute or have their branches be taken or not taken.

Also shown in FIG. 4 is an example set of hardware for performing the processor operations. This includes an instruction fetch unit 460, an instruction decoder 462 and a dispatch and issue unit 463. Instruction fetch unit 460 is used to fetch instructions from memory or instruction cache. The instruction decoder 462 decodes the fetched instructions and generates control signals used to configure the processor and gather input operands for processor operations. The dispatch and issue unit 463 dispatches particular operations to particular execution units 470 of the processor. The dispatch and issue unit 463 also controls when instructions are allowed to issue for performance by the execution units 470. Also shown in FIG. 4 is a register file 480 and a load store queue 485. The processor also includes a memory subsystem, including L1 cache 490, L2 cache 492, and memory 495.

The control logic 410, including speculation source tracking and remediation unit 420 and other associated components can be implemented using similar hardware components as the computing system 110, cores 115 and 116, control logic 130, and speculation tracking and remediation unit 160, as described in further detail above.

VII. Example Speculation Source Tracking Unit

Figure 5:
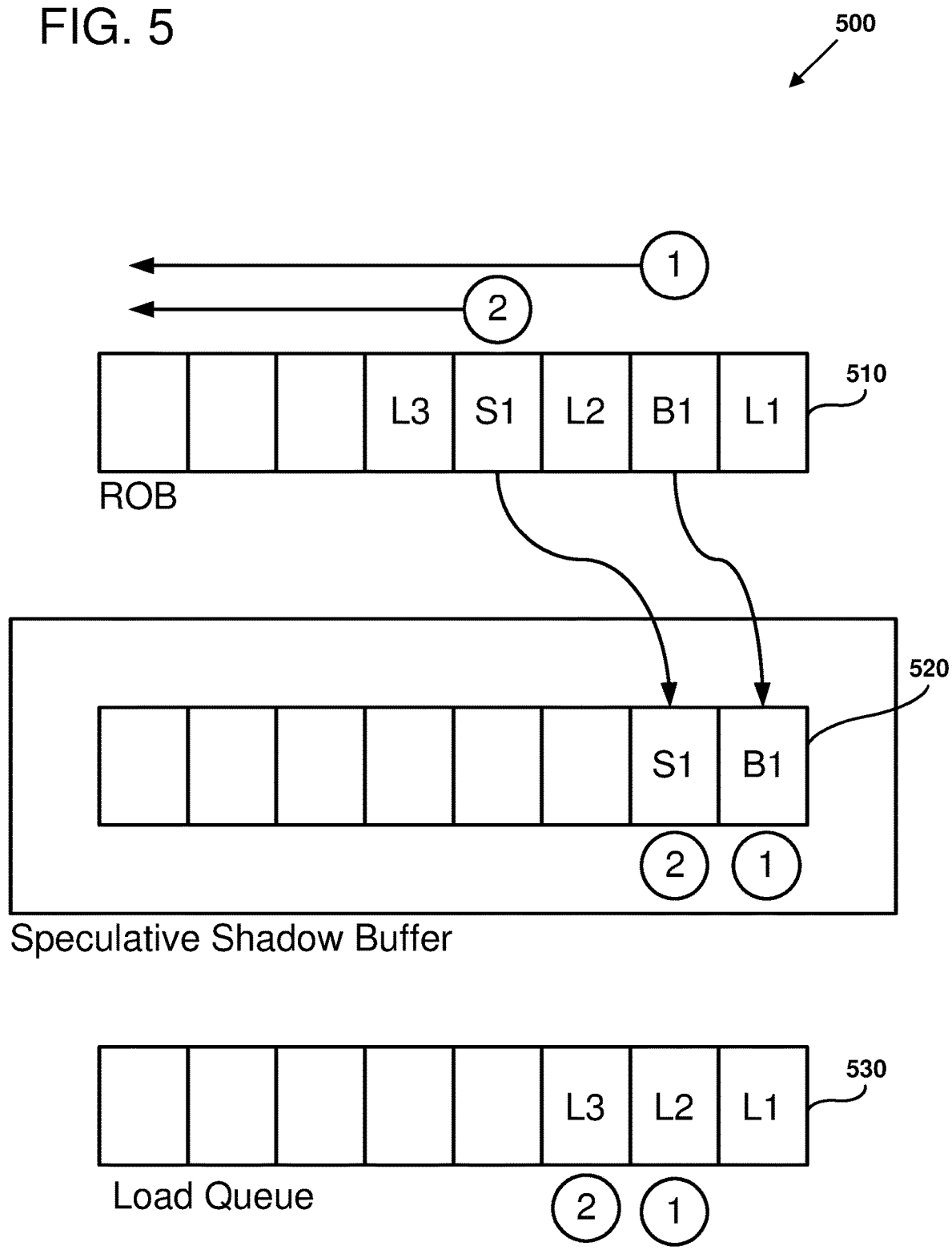
FIG. 5 illustrates an example use of a speculation shadow buffer, as can be implemented in certain examples of the disclosed technology.

FIG. 5 is a block diagram 500 outlining aspects of an example speculation source tracking unit, as can be implemented in certain examples of the disclosed technology. As shown in FIG. 5, a re-order buffer (ROB) stores tags indicating a number of processor instructions that have been ordered for execution as shown from right to left. For example, a first load instruction L1 will be issued first, followed by a first branch instruction B1, a second load instruction L2, a store instruction S1, and a third load instruction L1.

The speculation source tracking unit includes a speculative shadow buffer 520. The speculative shadow buffer 520 stores indicators of instructions in the ROB 510 that have been identified as sources of speculation. Thus, the branch instruction is stored at the head of the speculative shadow buffer 520 followed by the store instruction S1. As indicated above, the branch instruction B1 will taint all instructions that follow it in the ROB 510, until its associated speculation-source operation, which will determine whether or not a branch will be taken, or in some instances the address of a target branch, have been resolved, and thus the following instructions are no longer considered to be speculative. Similarly, the store instruction S1 will taint all instructions that follow it in the ROB 510 until its associated speculation-source operation has resolved, for example, calculation of an address to which data is to be stored for the executing store instruction S1 will gate resolving the instruction, and any instructions which depend on the store instruction S1. Further, instructions in the load queue 530 can be associated with speculative sources. In the illustrated example, the second load instruction L2 is identified as speculative, because it is not known whether the instruction will execute and commit until the speculation-source operation associated with the branch instruction B1 is resolved. Similarly, the third load instruction L3 is speculative until preceding taint-source operations S1 and B1 resolve. As the associated speculation source instructions execute and commit, entries can be removed from the speculative shadow buffer 520, and associated tainted values stored elsewhere in the speculation source tracking and remediation unit can take appropriate action to remove the taint marker.

VIII. Example Taint Matrix Micro-Architecture

Figure 6:
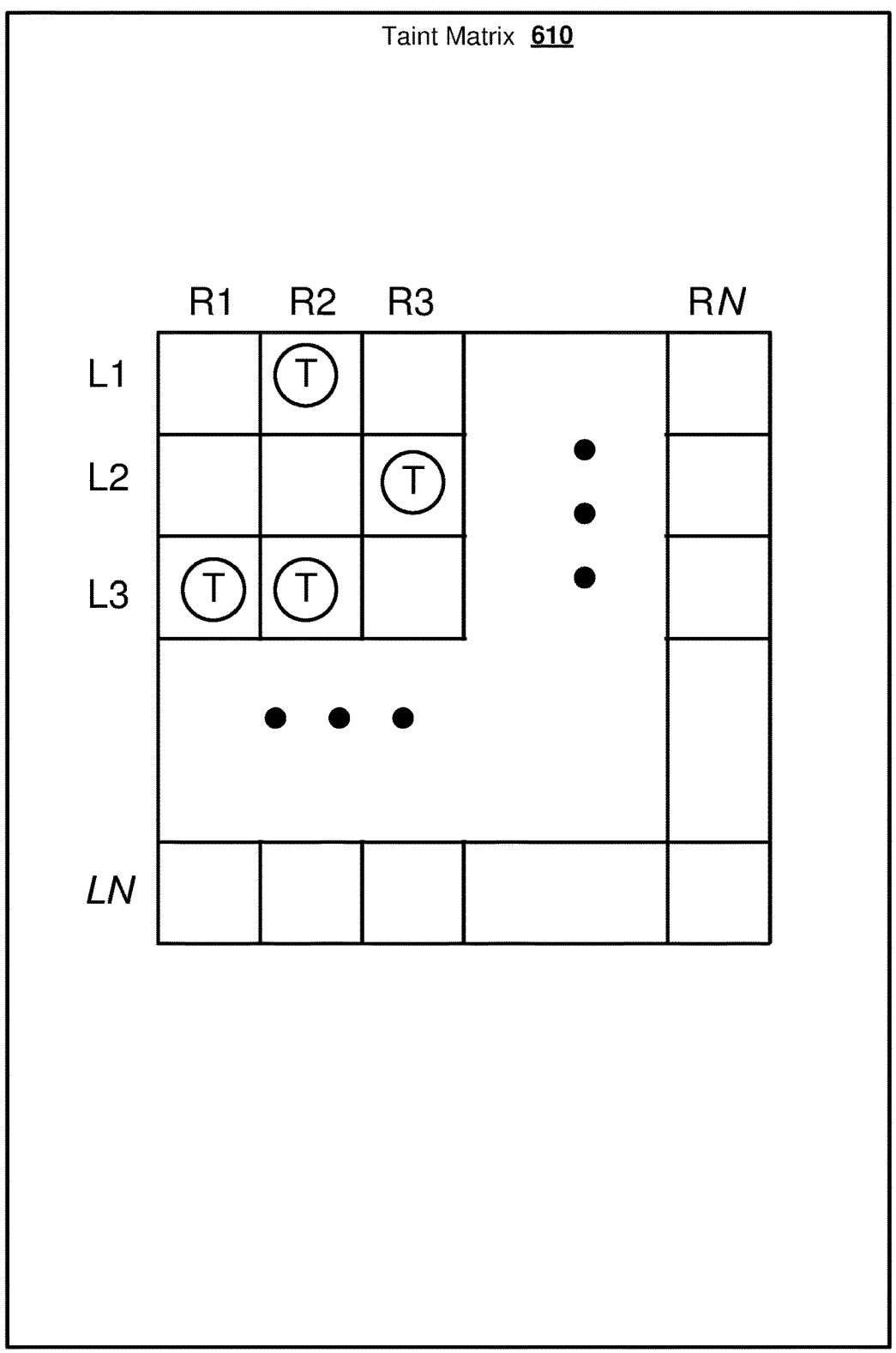
FIG. 6 illustrates an example use of a taint matrix memory, as can be implemented in certain examples of the disclosed technology.

FIG. 6 is a diagram 600 illustrating an example taint matrix 610 that can be used to track sources of speculative taint in accordance with certain examples of the disclosed technology. In the illustrated example, each column in the taint matrix 610 is associated with an architectural register of a processor, for example, R1, R2, R3, etc. Each row of the taint matrix 610 is associated with a load instruction, for example, L1, L2, L3 etc. In a typical implementation, the register columns are associated with either a logical processor register, or a physical processor register, in cases where the processor microarchitecture implements register renaming. For the memory load operations, a tag or other identifier can be used to track which particular load instructions are associated with a particular column of the taint matrix 610. As shown, the taint matrix stores associations between memory load instructions and registers that are affected by the load instruction. For example, the first row indicates that a load instruction L1 is associated with a register R2. This is typical where the memory load instruction writes its result to the register R2. The second row indicates that a load instruction L2 is associated with taint register R3. The third row indicates that a single load instruction L3 has a taint marker associated with two registers, R1 and R2. This is because, as will be discussed in further detail below, subsequent instructions that use a potentially-tainted value can also be marked as tainted. Thus, when a speculation source is resolved, more than one register that is tracked as being tainted, can be untainted during the remediation process.

Figure 7:
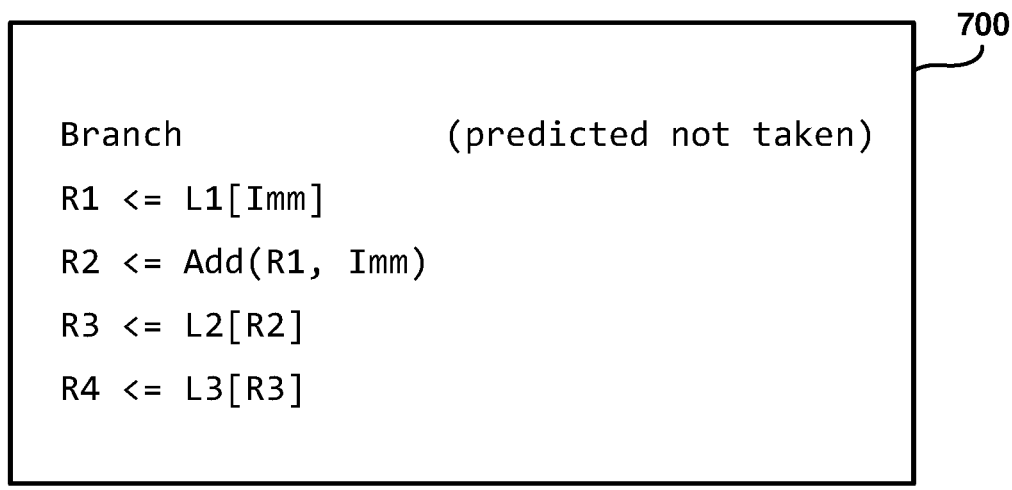
FIG. 7 is an example of code that can be speculatively executed and remediated according to certain examples of the disclosed technology.

IX. Example Method of Remediating Side Channel Attack Using a Speculation Shadow Buffer and a Taint Matrix FIG. 7 includes an example of processor instructions 700 that are speculatively executed in the example of FIGS. 8A-8I. In this example, the first conditional branch instruction will be predicted to be not taken. However, prior to resolving the branch as actually being not taken, the subsequent instructions, which include three load instructions and an add instruction, can be speculatively executed. Thus, the fact that these operations may be considered tainted, and thus potentially creating side effects leading to information leakage, can be monitored by a processor implemented according to the disclosed technology and remedied. The term "conditional branch" refers to a branch that is taken or not taken based on a conditional value. For example, in some instruction set architectures, another instruction is used to generate a Boolean value by comparing or testing two data (e.g., greater than, greater than or equal, less than, less than or equal, equal, etc.). The specific branch instruction may take a branch to a new program counter location, depending on the Boolean value. If the branch is not taken, the program counter is incremented (or decremented) and the next instruction in memory is executed. In some examples, the branch instruction can be predicated on a value generated by another instruction. In some examples, an absolute branch (an instruction that does not specify a conditional, and so will always branch when executed) may be conditional if it is dependent on a speculation source produced by another instruction; for example; a memory address calculation.

FIGS. 8A-8I illustrate operations performed with a speculation source tracking unit and taint matrix to avoid side effects causing information leakage from a cache, as can be implemented in certain examples of the disclosed technology.

Figure 8A:
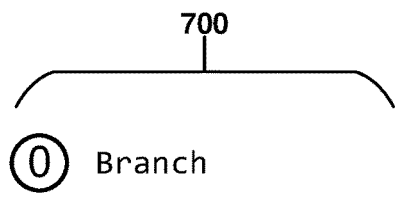
FIGS. 8A-8I illustrate an example method of tracking and remediating cache side effects using a speculation shadow buffer and taint matrix, as can be performed in certain examples of the disclosed technology.
Figure 8A:
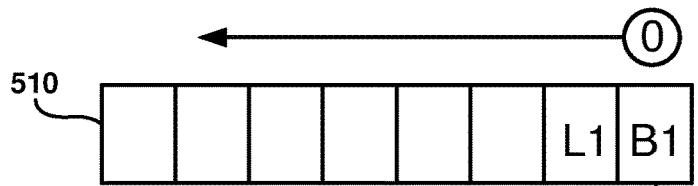
Figure 8A:
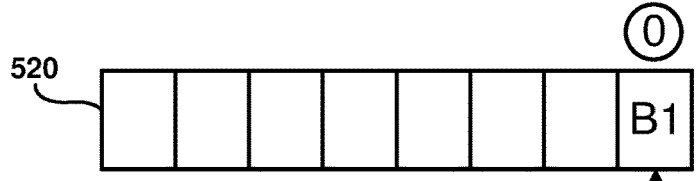
Figure 8A:
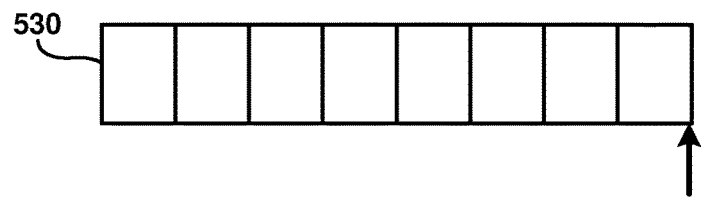
Figure 8A:
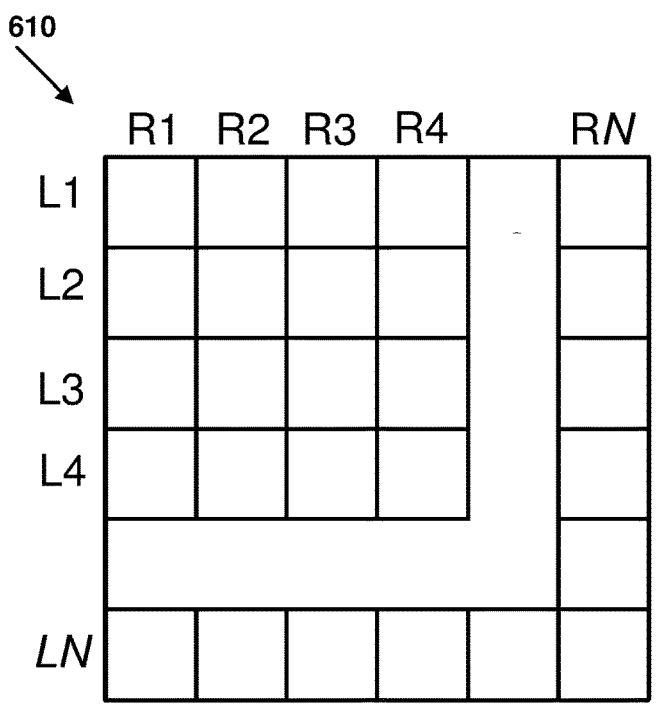

As shown in FIG. 8A, the conditional branch instruction 0 (B1) has been speculatively taken, and so the predicted next instruction is a memory load instruction L1, which has been speculatively added to the ROB 510. Two instructions, branch instruction B1 and a load instruction L1, are stored in the ROB 510. Because the branch instruction is a potential source of speculation, an entry indicating the branch is stored in the speculative shadow buffer 520. No load instructions are currently in the load queue 530. Further as shown, there are no current entries in the associated taint matrix 610.

Figure 8B:
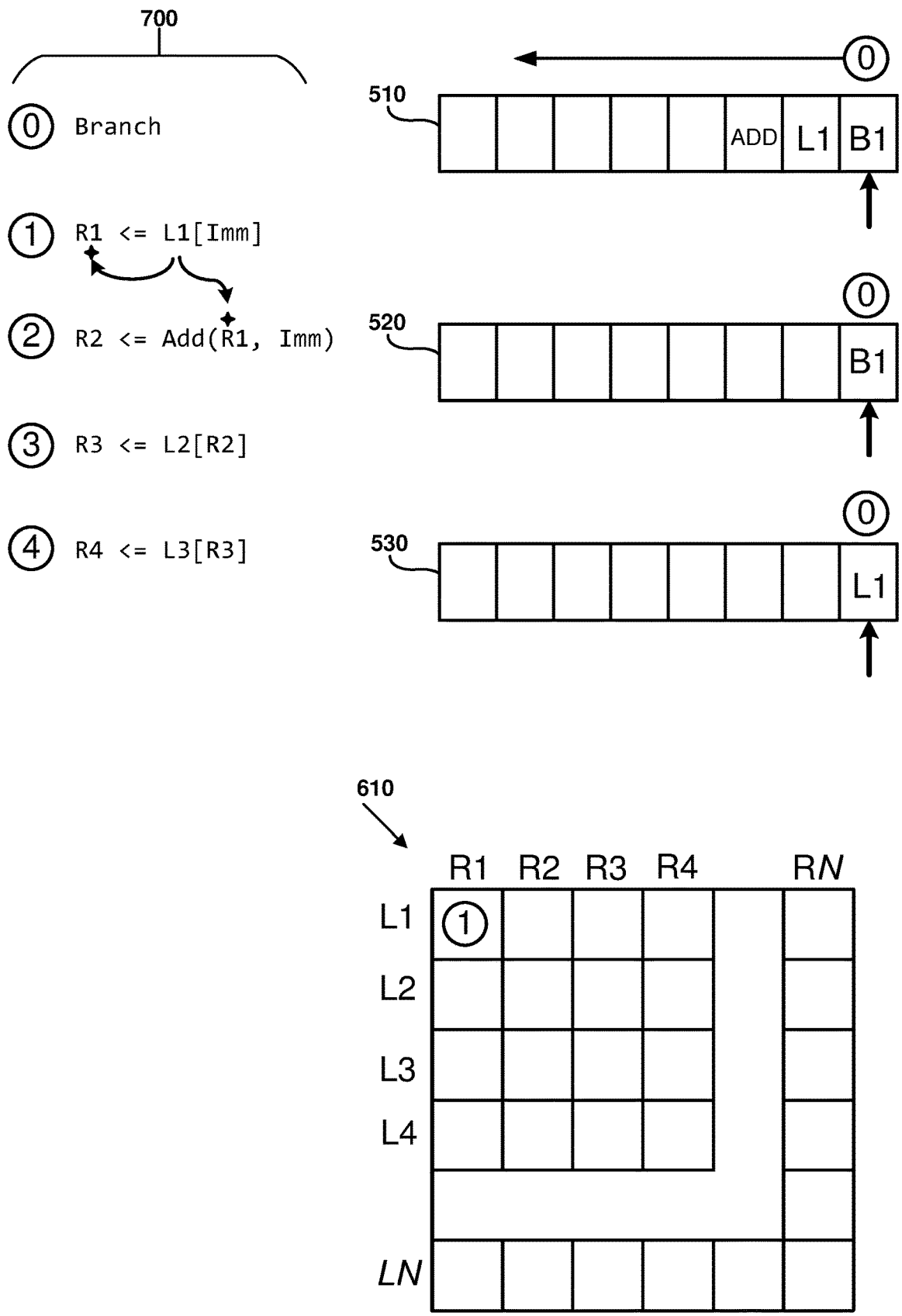

Execution proceeds as shown in FIG. 8B. As shown, the memory load instruction L1 taints its destination register R1 The add instruction has been added to the ROB 510. Further, the immediate memory load instruction L1 has been added to the load queue 530. Because the branch instruction is still speculative, both the operation associated with storing the result in the register R1 as well as other instructions that receive this result (the add instruction 2) are indicated as being tainted with a star (✦). This taint can be recorded in the taint matrix 610, which associates the speculative memory instruction L1 with the tainted register R1.

Figure 8C:
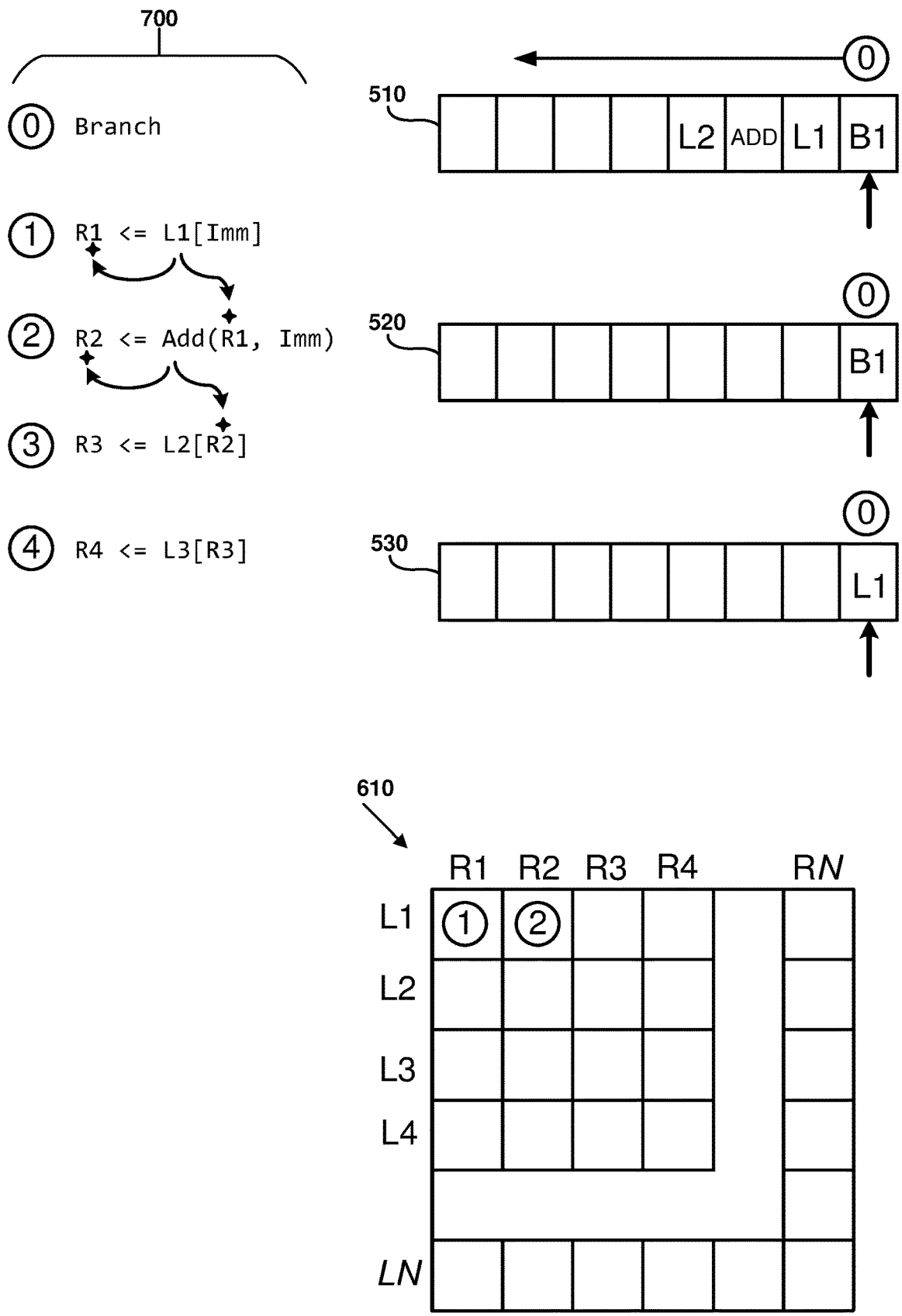

Execution proceeds further as shown in FIG. 8C. Here, the memory load instruction L2 has been added to the ROB 510. Because this load instruction is also dependent upon the condition associated with the branch instruction, register R2 is also tainted by the instruction L1. Thus, the taint matrix is further modified to indicate that the memory load instruction L1 also taints register R2.

Figure 8D:
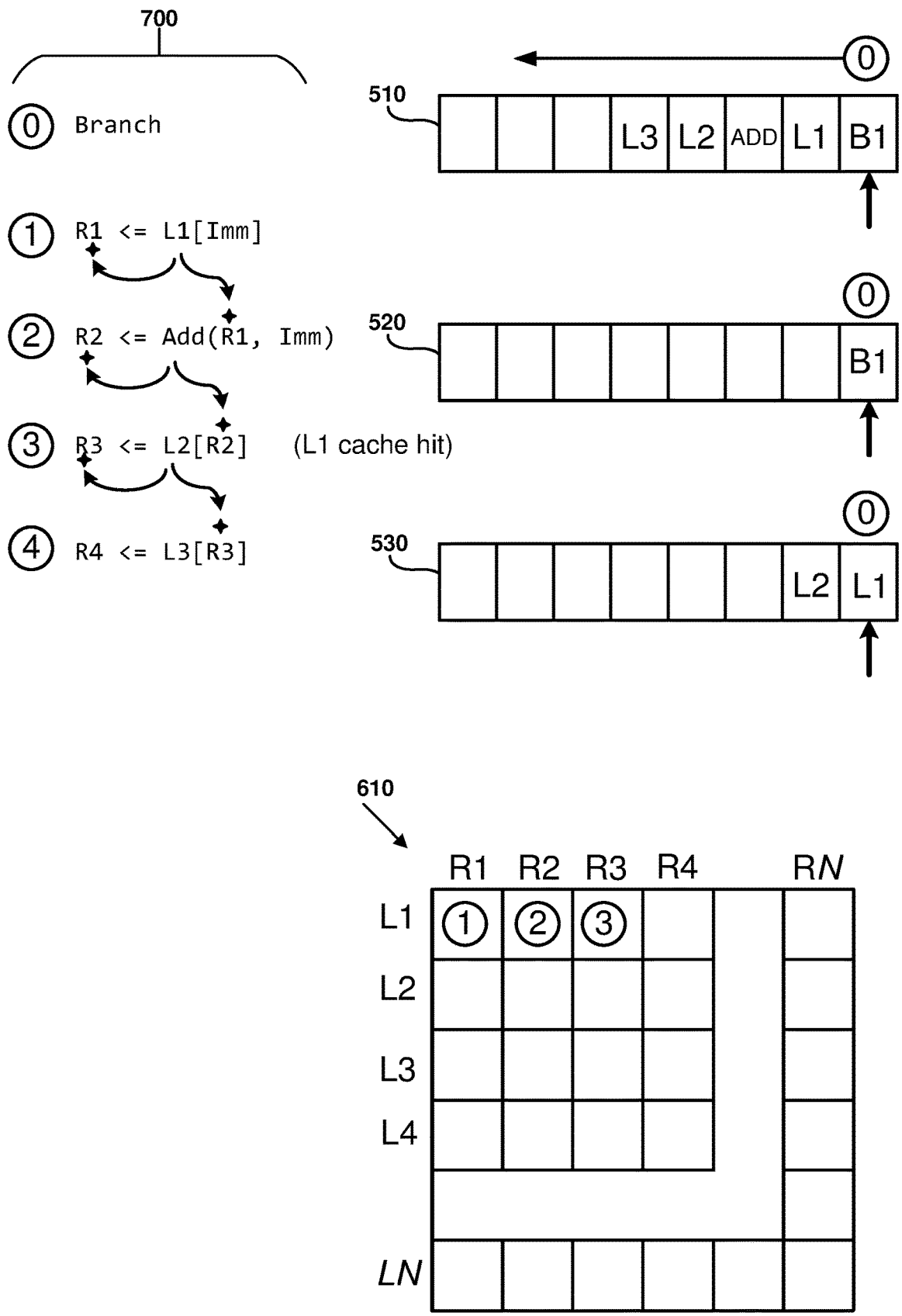

Execution proceeds further as shown in FIG. 8D. The speculative secret access tracking unit has determined that register R3 as also tainted. The memory load instruction L3 has been added to the ROB 510. Further, the load instruction L2 is a cache hit and so the result of this load instruction is added to the load queue 530. As shown, the taint matrix 610 is updated so that register R3 is also indicated to be tainted by the first load instruction L1.

Figure 8E:
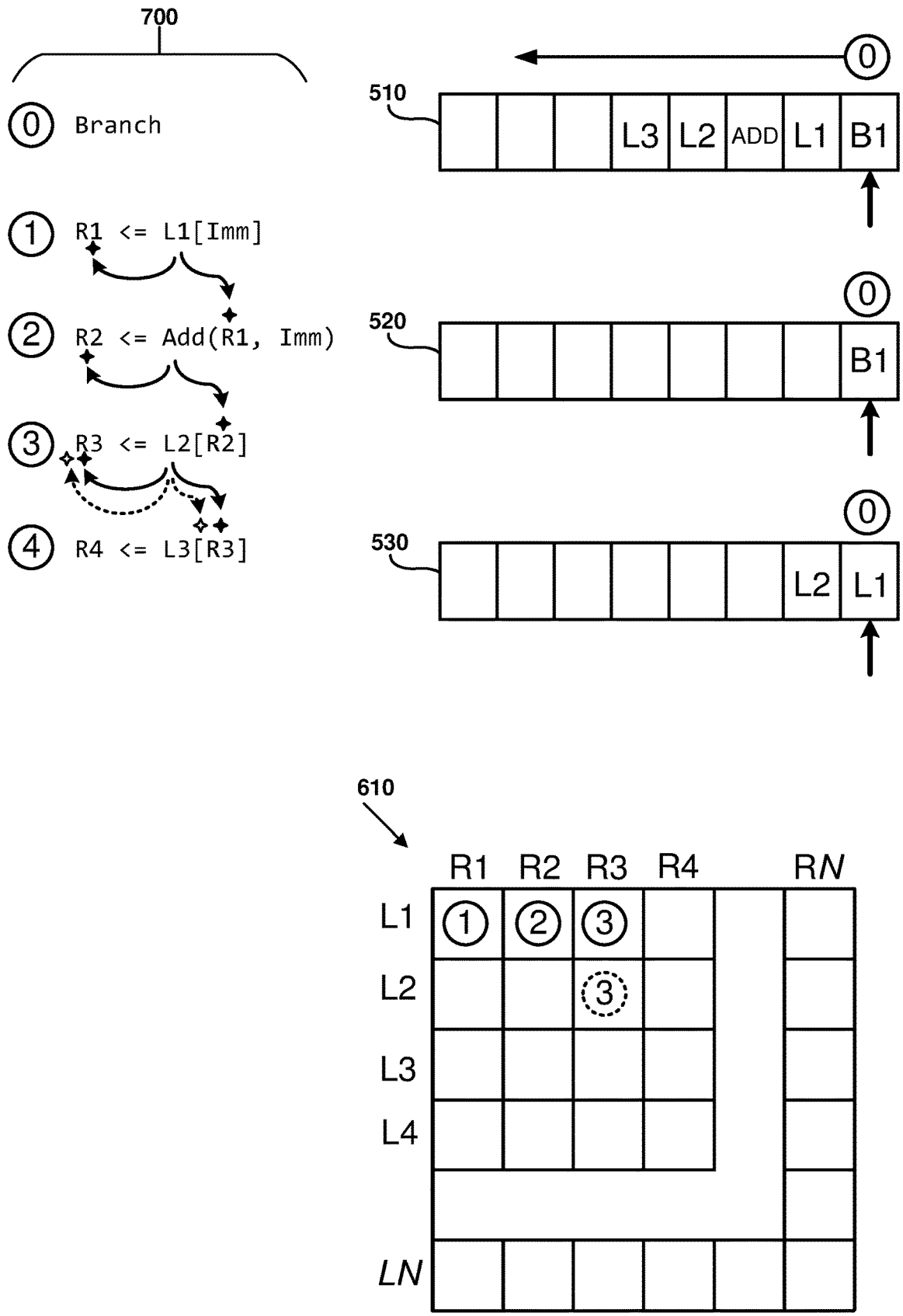

Execution proceeds further as shown in FIG. 8E. Here, the speculative secret access tracking unit has determined that memory load instruction L2 will also taint register R3. Thus, an additional entry is added to the taint matrix 610 to indicate another source of speculative taint to register R3.

Figure 8F:
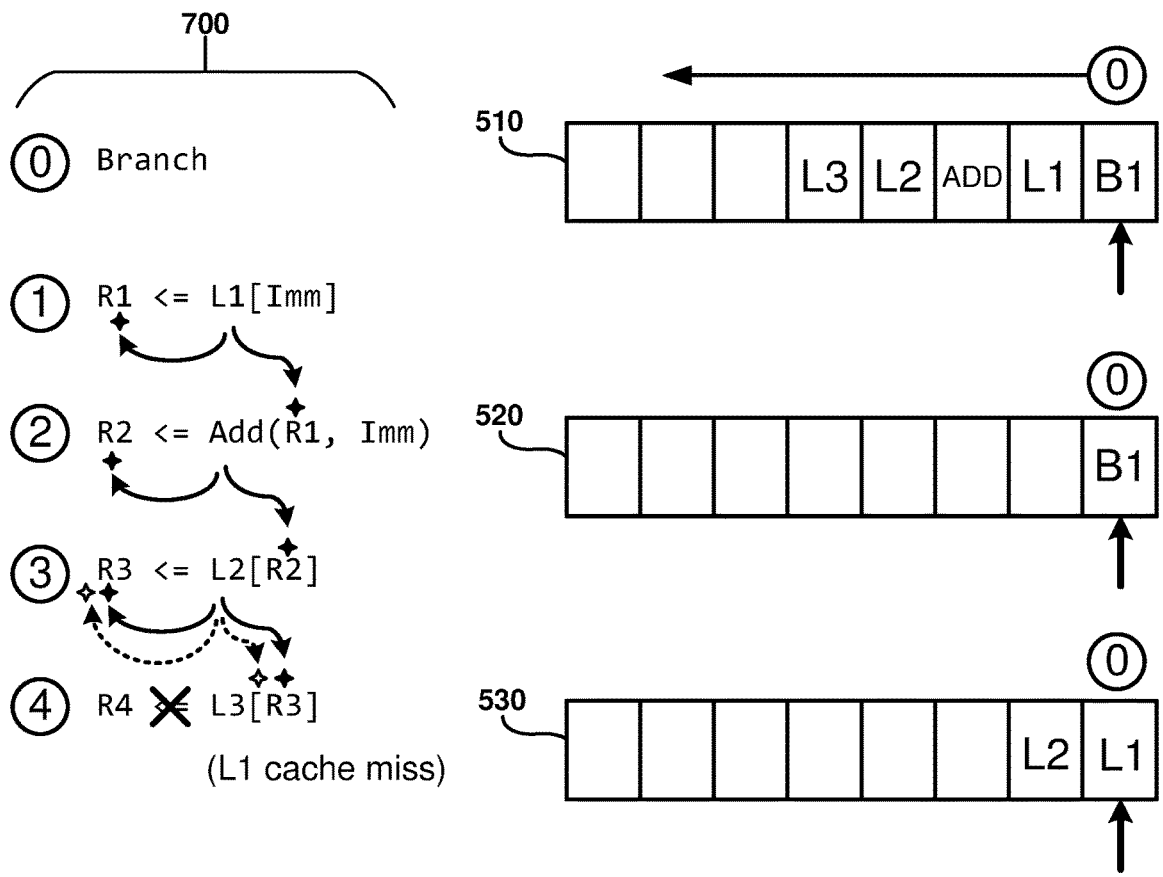
Figure 8F:
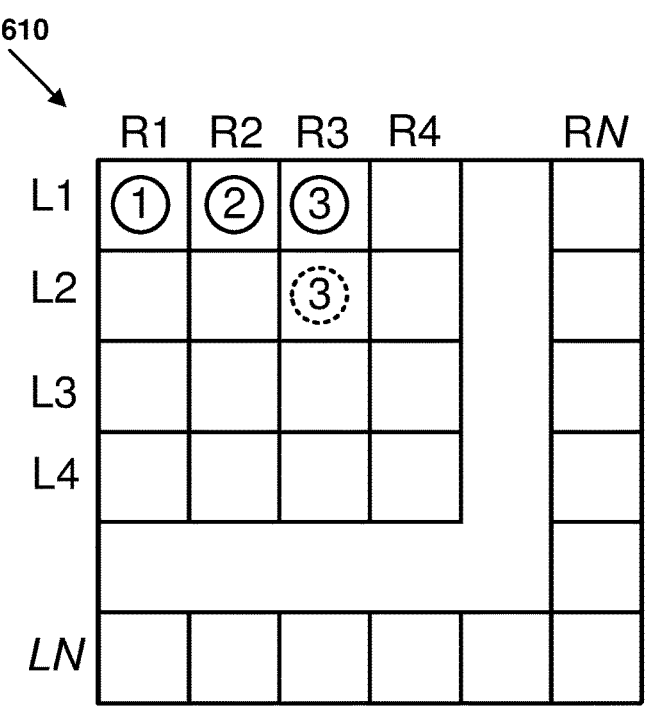

Execution proceeds as shown further in FIG. 8F. Here, the memory load instruction L3 results in a cache miss. Thus, in this example, there is not a taint matrix entry made for instruction 4.

Figure 8G:
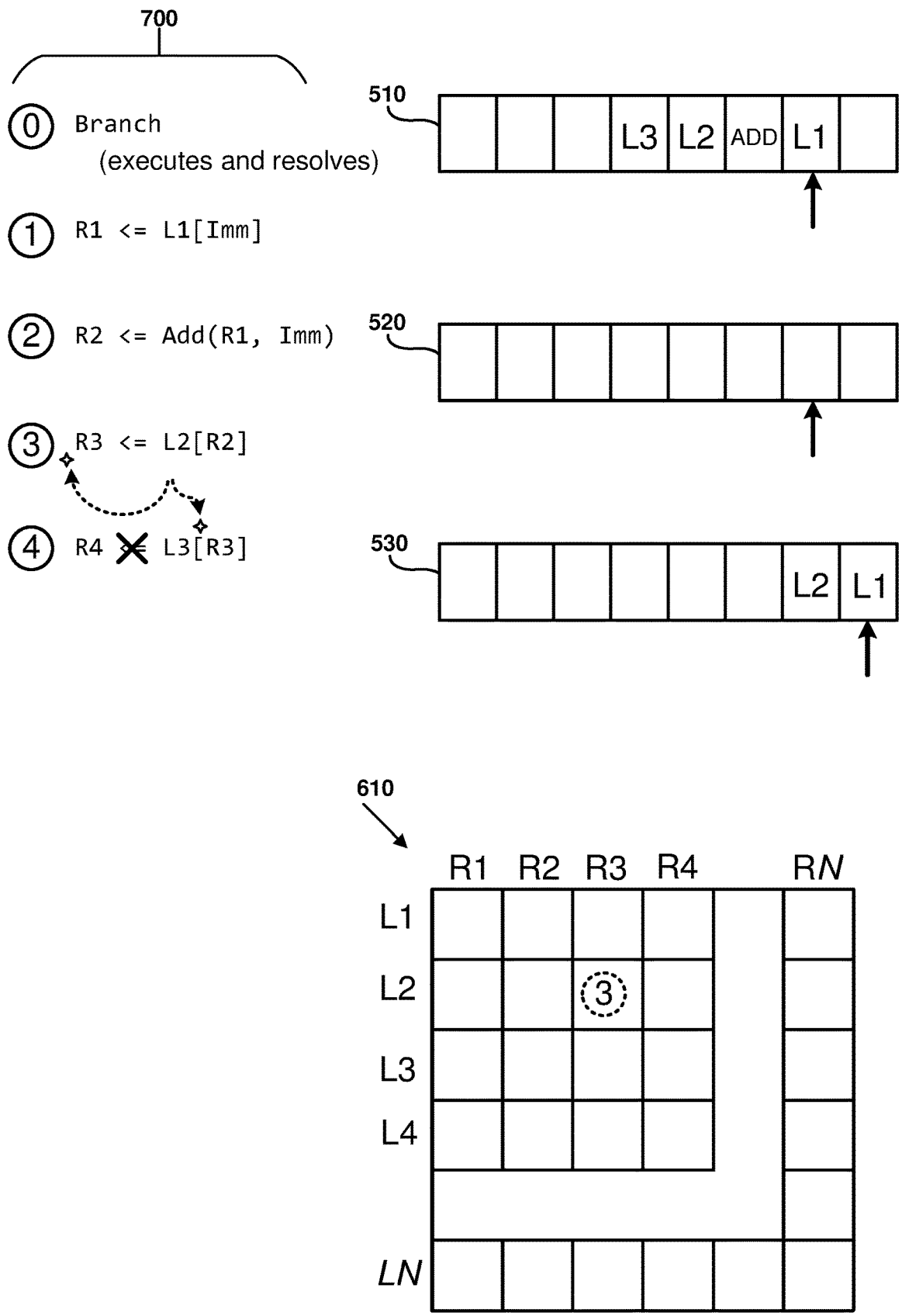

Execution proceeds further as shown in FIG. 8G. Here, the branch conditional instruction B1 has resolved its condition, completed execution, and resolved. Thus, the shadow buffer has been cleared for the associated instruction L1, thereby removing the taint from the first row of the taint matrix 610. However, execution has not yet proceeded to identify the removal of the taint associated with the second load instruction L2.

Figure 8H:
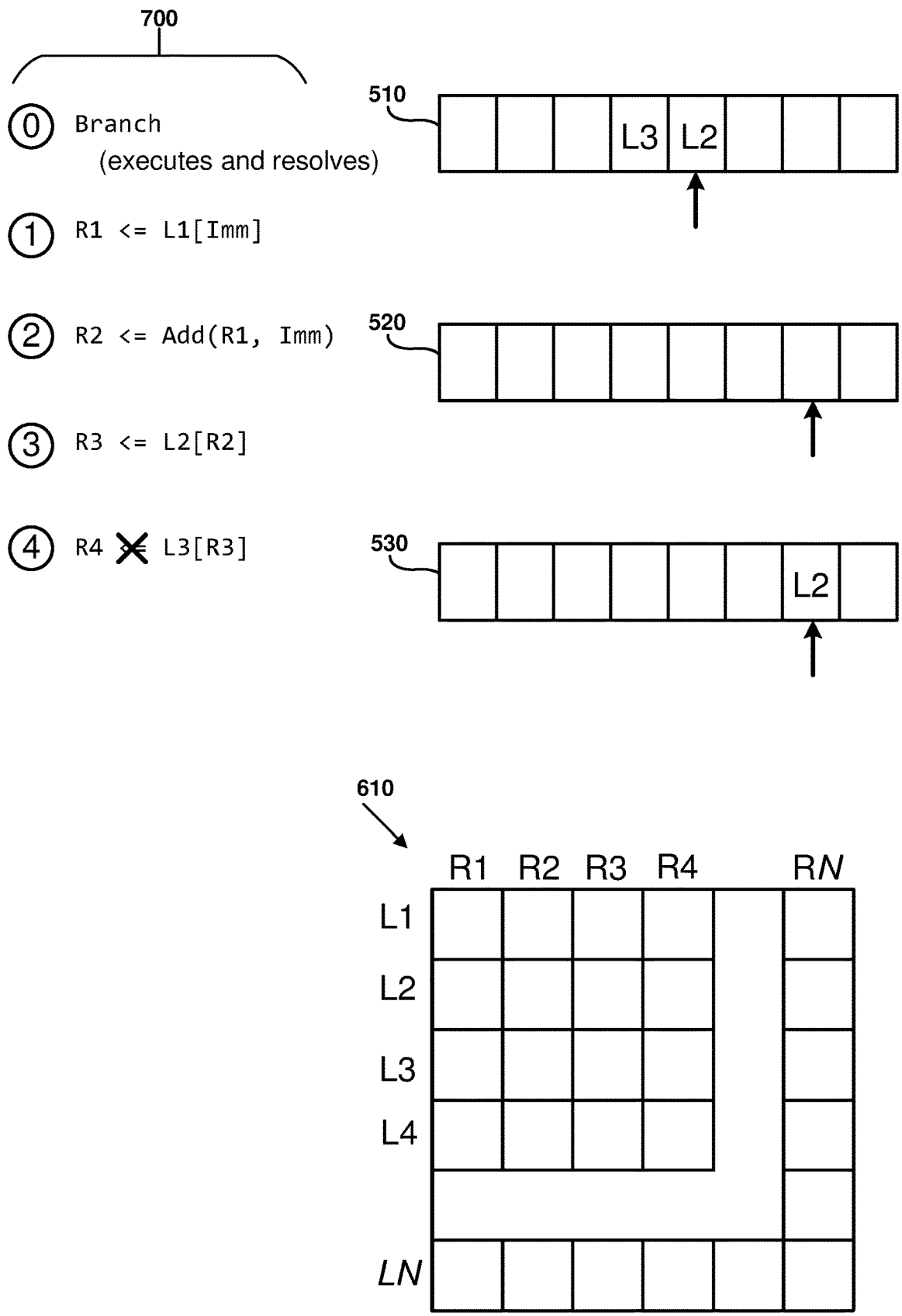

Execution proceeds further as shown in FIG. 8H. Here, load instruction L1 has retired, and the next load instruction, L2 will be retired next. Thus, the entry in the taint matrix for memory load instruction L2 has been cleared as indicated.

Figure 8I:
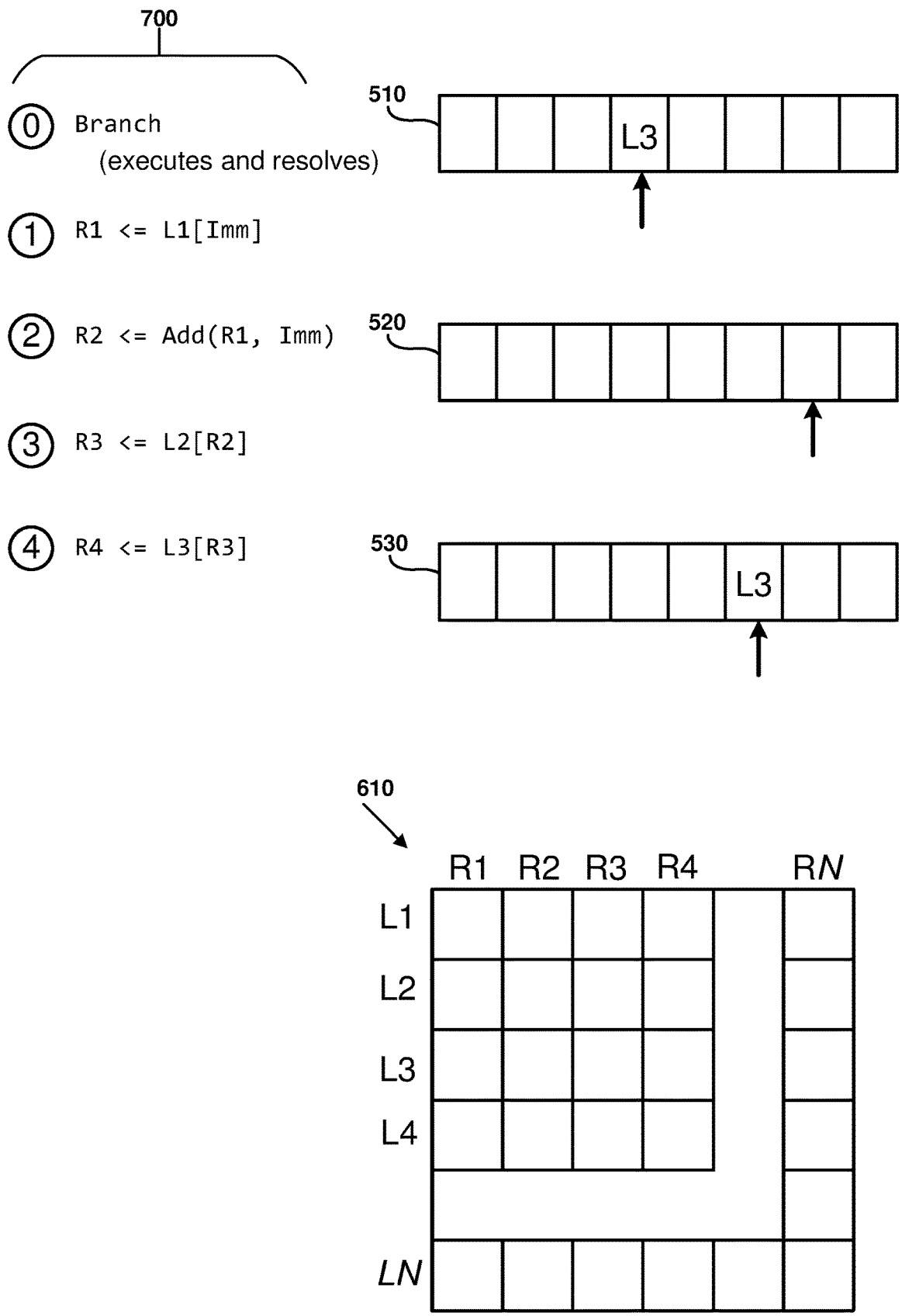

As shown in FIG. 8I, the second load instruction L2 has retired and the next load instruction, L3 will be retired next.

Thus, as illustrated in the example of FIGS. 8A-8I, side effects of speculative execution can be prevented from becoming observable to other code executing on the processor. In particular, for the example code of FIG. 3, if the array bounds check indicated that the access was out of bounds, there would be no side effects from speculative execution of the instructions inside the if statement, because the side effects would have been suppressed through the use of the speculation source tracking unit and suspected a secret access tracking unit.

X. Example Impact of Taint-Based Memory Channel Blocking

Figure 9:
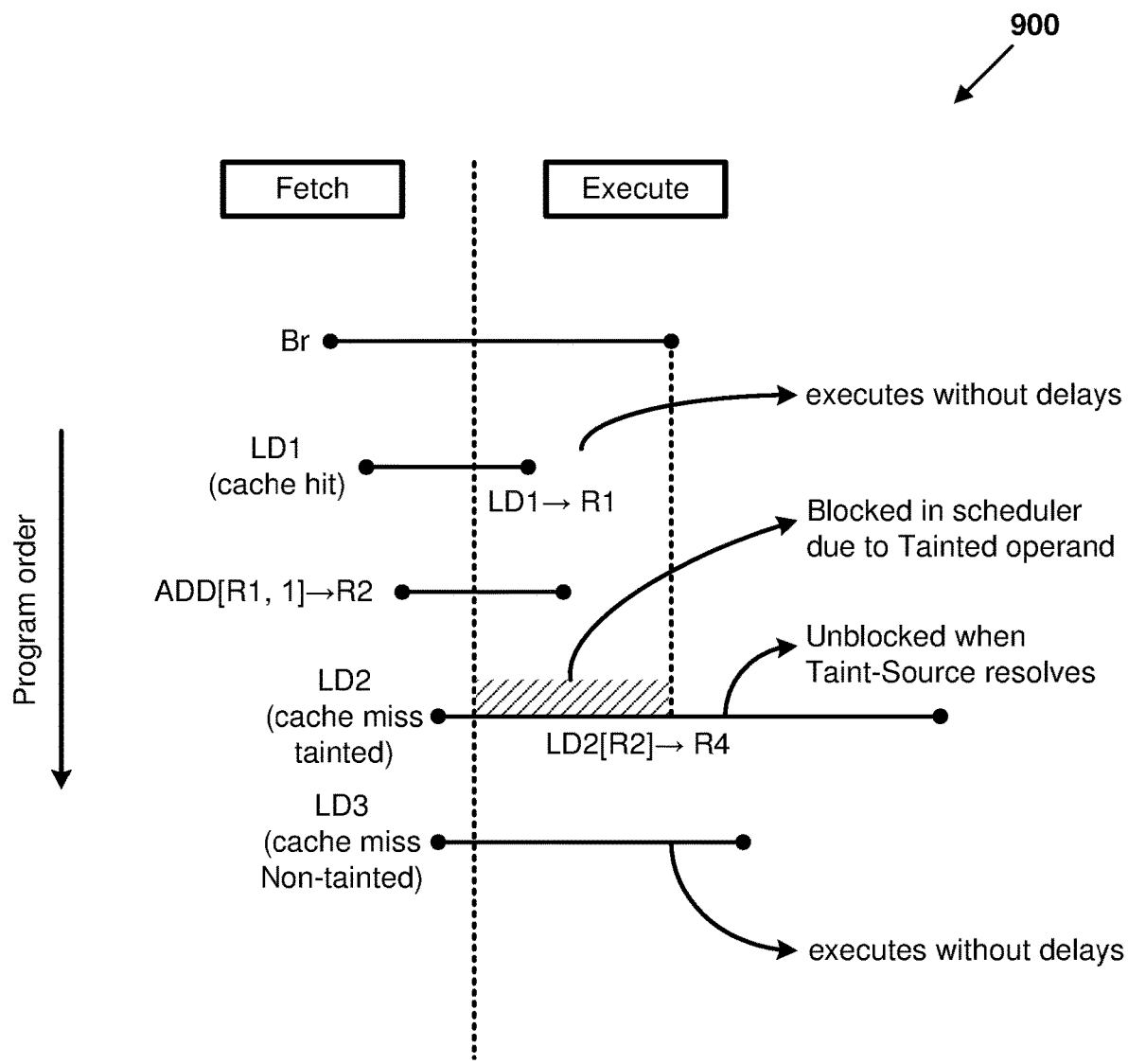
FIG. 9 is a diagram illustrating an example of taint matrix-based blocking on memory load execution, as can be observed in certain of limitations of the disclosed technology.

FIG. 9 is a diagram 900 illustrating the impact of taint-based blocking on memory load execution, as can be performed in certain examples of the disclosed technology. As shown, instructions executed in the indicated program order. The branch instruction Br fetches first, but execution is delayed until the associated branch condition it was resolved. Next, the first load instruction, LD1, results in a cache hit and is executed without delay. However, the associated taint is tracked until the branch instruction ultimately resolves. Similarly, the ADD instruction begins execution, but is not committed until the conditional associated with the branch instruction resolves. The second load instruction LD2 will be blocked in the scheduler due to his tainted input operand, and unblocked when the associated taint source, the branch instruction, resolves as shown. A third load instruction, LD3, is not tainted by the branch instruction, and hence can execute without further delays. Thus, untainted load instructions can issue, while load instructions dependent upon taint-source operations can be delayed or otherwise remediated. Thus, because not all memory load instructions are delayed but only those associated with a speculation source, performance of the processor can be improved. In other words, only speculative and tainted L1 cache misses are delayed, until the associated taint-source becomes non-speculative.

XI. Example Method of Suppressing Side Effects of Taint-Source Operation

Figure 10:
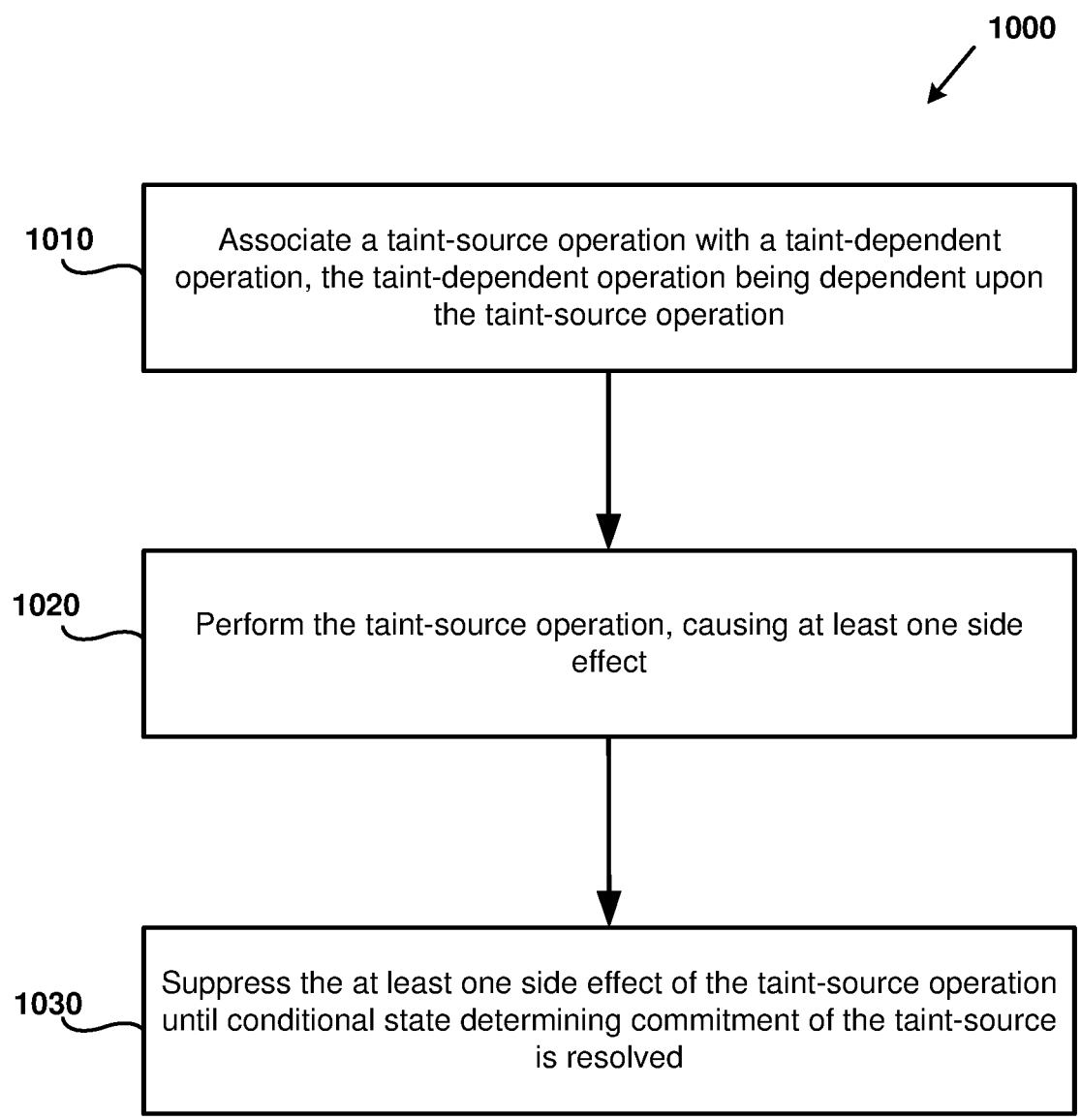
FIG. 10 is a flowchart outlining an example method of suppressing side effects of taint-source operations, as can be performed in certain examples of the disclosed technology

FIG. 10 is a flowchart 1000 outlining an example method of identifying taint-source operations and suppressing associated side effects, as can be performed in certain examples of the disclosed technology. For example, any of the computing systems discussed above may be used to implement the illustrated method.

At process block 1010, a taint-source operation is associated with an operation dependent upon the taint-source operation. For example, the taint-source operation can be a memory load instruction and the taint-dependent operation can be writing to an architectural register that receives a result of the memory load instruction. Examples of suitable hardware structures for performing such association include speculative shadow buffers and/or taint matrices. By tracking a conditional source of speculation, for example, a branch instruction or a memory store instruction, execution of the instruction window can be monitored and a taint marker removed once speculation has been resolved.

At process block 1020, the taint-source operation identified at process block 1010 is performed. For example, a memory load instruction can be fetched, decoded, and dispatched.

At process block 1030, at least one side effect of the taint-source operation is suppressed until conditional state determining commitment of the respective operation is resolved. For example, the memory load instruction can be installed, and thus not attempt to load values into the cache, until its associated speculation-source operation is determined. For example, the associated speculation-source operation as a branch instruction, the side effects of the memory load instruction are suppressed until is determined whether the branch instruction will be taken or not taken, and what the target address of the branch instruction is.

Figure 11:
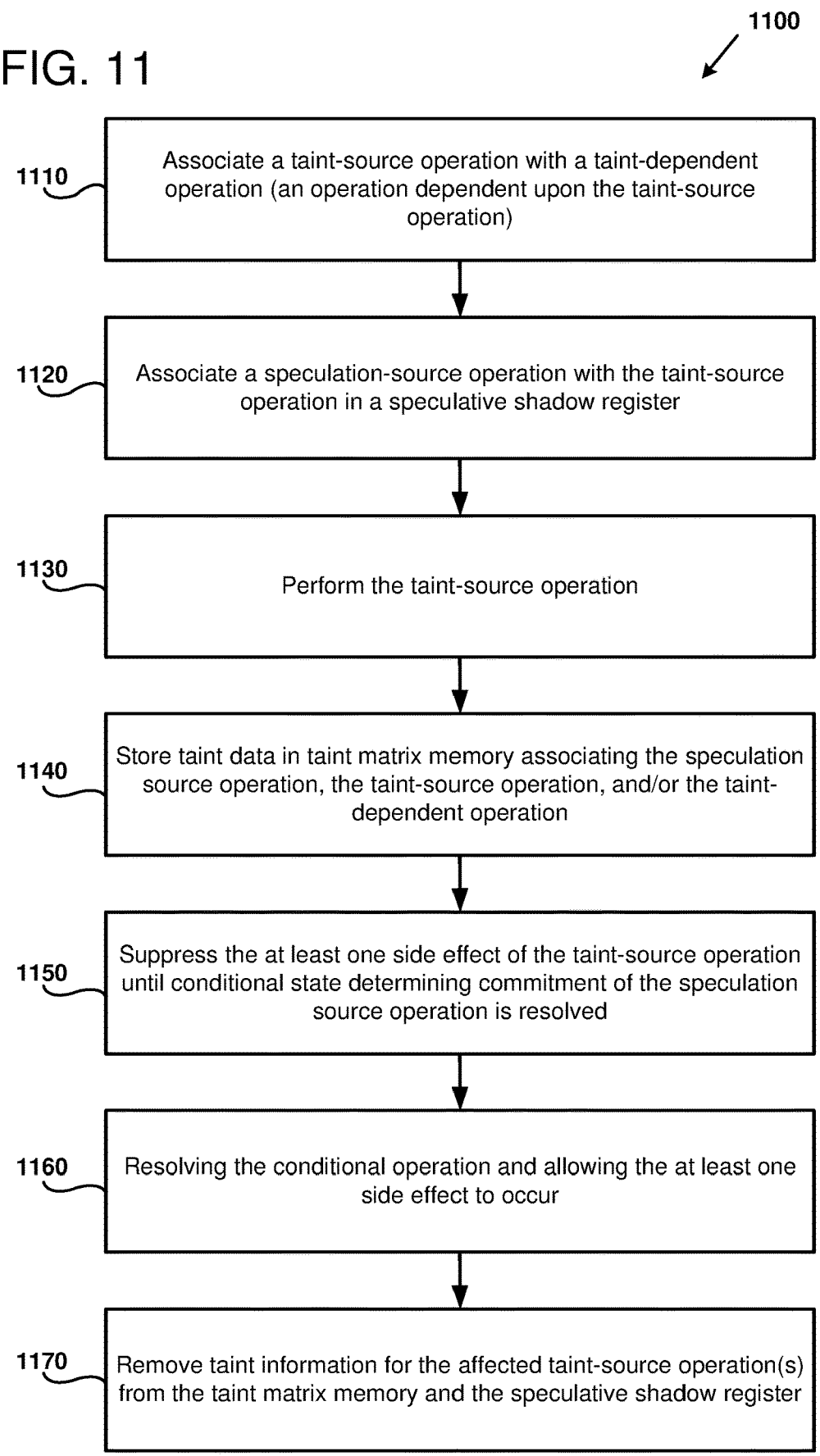
FIG. 11 is a flowchart outlining an example method of suppressing side effects of operations using a speculative shadow buffer and taint matrix, as can be performed in certain examples of the disclosed technology.

XII. Example Method of Suppressing Side Effects with A Speculative Shadow Register and Taint Matrix FIG. 11 is a flowchart 1100 outlining an example method of operating a processor and suppressing side effects of taint-source operation, as can be performed in certain examples of the disclosed technology. For example, any of the example computing systems discussed above may be used to implement the illustrated method.

At process block 1110, a taint-source operation is associated with an operation dependent upon the taint-source operation. For example, in the case of Spectre remediation discussed above, the speculative operation can be a memory load instruction and the taint-dependent operation can be storage of potentially tainted values in a processor register that is visible to the programmer.

At process block 1120, a speculation-source operation that is a source of the taint-source operation is associated in a speculative shadow register. For example, a conditional branch instruction or memory store can be the speculation-source operation. Information indicating these conditional sources is stored in the shadow register so that it can be tracked as performance of the taint-source operation is allowed to at least partially proceed.

At process block 1130, at least a portion of the taint-source operation is performed. For example, the instruction may be fetched and decoded. A portion of address calculation for the operation may proceed. However, based on the operation being identified as speculative, certain aspects of the taint-source operation may be delayed or inhibited. For example, the taint-source operation may not be allowed to dispatch or issue. In some examples, taint-source operation may not be allowed to write back or to commit. The degree to which speculative operation side effects are suppressed can be selected by a designer of the processor or in some cases may be at least partially user selectable. For example, some computer instructions may be known to be more sensitive to attack, and thus a higher degree of inhibition applied to speculative of operations thereby performed.

At process block 1140, taint data is stored in a memory associating the speculation-source operation, the taint-source operation, and/or the taint-dependent operation. The taint matrix memory is typically not programmer visible, but instead only visible within the control logic microarchitecture. The taint matrix may be implemented as a small memory accessible to the control logic. In some examples, the taint matrix may be visible in the case of operating the processor in special supervisor or debug modes. Thus, until the speculation-source operation resolves, the taint data indicates that there are associated taint-source operations and taint-dependent operations that are potentially tainted and susceptible to attack. If, for example, the speculative path should not have been taken based on the ultimate result of the speculation-source operation.

At process block 1150, at least one side effect of the taint-source operation is suppressed conditional state determining commitment of the taint-source operation is resolved. Until some examples of suppressing such side effects were discussed above at process block 1130.

At process block 1160, the speculation-source operation associated at process block 1120 is resolved. If the speculative prediction was correct, then associated side effects can be allowed to occur. Conversely, if the speculative prediction was not correct, then the associated side effects are quashed so that they are not observable to a potential attacker and thus the operations associated with the taint-source operations are suppressed so as not to change the microarchitectural state to prevent information leakage.

At process block 1170, taint information that was stored in the memory and/or suspected of shadow buffer are removed or cleared for the effective taint-source operations. This act will allow further performance of any taint-source operations that were suppressed waiting upon a conditional.

Conversely, if the speculative prediction was not correct, then the taint information is also are removed, freeing up memory in the taint matrix and speculative shadow register.

XIII. Example Generalized Computing Environment

Figure 12:
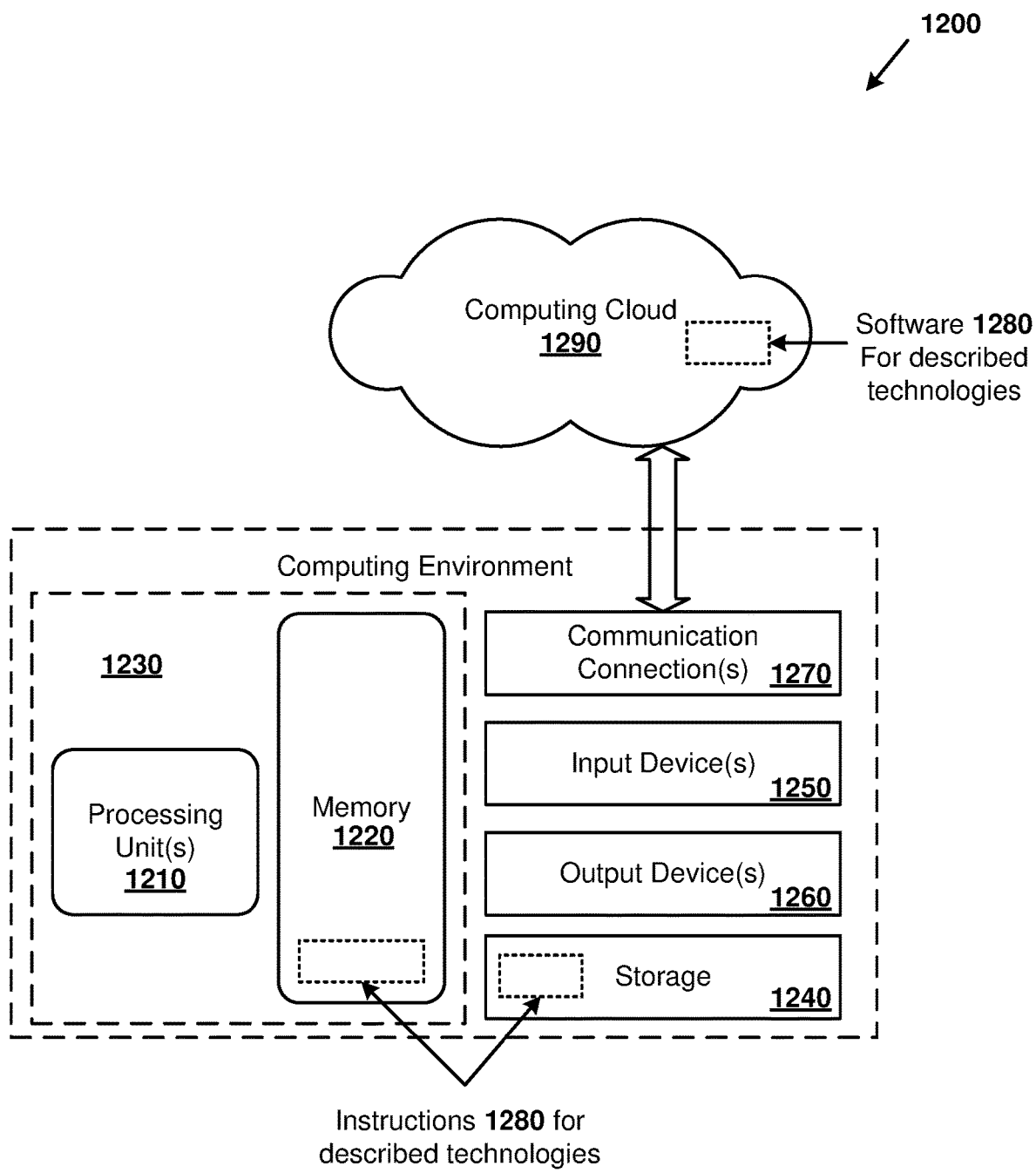
FIG. 12 is a diagram illustrating an example computing environment in which the disclosed methods and apparatus can be implemented.

FIG. 12 illustrates a generalized example of a suitable computing environment 1200 in which described embodiments, techniques, and technologies, including identifying sources of speculation and suppressing side effects using a speculation tracking and remediation unit, can be implemented.

The computing environment 1200 is not intended to suggest any limitation as to scope of use or functionality of the technology, as the technology may be implemented in diverse general-purpose or special-purpose computing environments. For example, the disclosed technology may be implemented with other computer system configurations, including hand held devices, multi-processor systems, programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 12, the computing environment 1200 includes at least one processing unit 1210 and memory 1220. In FIG. 12, this most basic configuration 1230 is included within a dashed line. The processing unit 1210 executes computer-executable instructions and may be a real or a virtual processor. In a multi-processing system, multiple processing units execute computer-executable instructions to increase processing power and as such, multiple processors can be running simultaneously. The memory 1220 may be volatile memory (e.g., registers, cache, RAM), non-volatile memory (e.g., ROM, EEPROM, flash memory, etc.), or some combination of the two. The memory 1220 stores software 1280, images, and video that can, for example, implement the technologies described herein. A computing environment may have additional features. For example, the computing environment 1200 includes storage 1240, one or more input devices 1250, one or more output devices 1260, and one or more communication connections 1270. An interconnection mechanism (not shown) such as a bus, a controller, or a network, interconnects the components of the computing environment 1200. Typically, operating system software (not shown) provides an operating environment for other software executing in the computing environment 1200, and coordinates activities of the components of the computing environment 1200.

The storage 1240 may be removable or non-removable, and includes magnetic disks, magnetic tapes or cassettes, CD-ROMs, CD-RWs, DVDs, or any other medium which can be used to store information and that can be accessed within the computing environment 1200. The storage 1240 stores instructions for the software 1280, which can be used to implement technologies described herein.

The input device(s) 1250 may be a touch input device, such as a keyboard, keypad, mouse, touch screen display, pen, or trackball, a voice input device, a scanning device, or another device, that provides input to the computing environment 1200. For audio, the input device(s) 1250 may be a sound card or similar device that accepts audio input in analog or digital form, or a CD-ROM reader that provides audio samples to the computing environment 1200. The output device(s) 1260 may be a display, printer, speaker, CD-writer, or another device that provides output from the computing environment 1200.

The communication connection(s) 1270 enable communication over a communication medium (e.g., a connecting network) to another computing entity. The communication medium conveys information such as computer-executable instructions, compressed graphics information, video, or other data in a modulated data signal. The communication connection(s) 1270 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the software and hardware. In a virtual host environment, the communication(s) connections can be a virtualized network connection provided by the virtual host.

Some embodiments of the disclosed methods can be performed using computer-executable instructions implementing all or a portion of the disclosed technology in a computing cloud 1290. For example, the disclosed methods can be executed on processing units 1210 located in the computing environment 1230, or the disclosed methods can be executed on servers located in the computing cloud 1290.

Computer-readable media are any available media that can be accessed within a computing environment 1200. By way of example, and not limitation, with the computing environment 1200, computer-readable media include memory 1220 and/or storage 1240. As should be readily understood, the term computer-readable storage media includes the media for data storage such as memory 1220 and storage 1240, and not transmission media such as modulated data signals.

XIV. Additional Examples of the Disclosed Technology

Additional examples of combinations and subcombinations of practical applications of the disclosed technology in accordance with the foregoing disclosure are recited here without limitation.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method of operating a processor, the method including: associating a taint-source operation with an operation dependent upon the taint-source operation. The method of operating also includes performing the taint-source operation, causing at least one side effect. The method of operating also includes suppressing the at least one side effect of the taint-source operation until conditional state determining commitment of the taint-source operation is resolved. Other embodiments of this aspect include corresponding computer systems, apparatus, and computer programs recorded on one or more computer storage devices, each configured to perform the actions of the methods.

Certain implementations may include one or more of the following features. The method further including: associating a speculation-source operation with the taint-source operation. The method can also include storing taint data associating the speculation-source operation, the taint-source operation, and the taint-dependent operation. The method can also include where the suppressing is performed based on the stored taint data. The method where the stored taint data indicates that the taint-source operation has not resolved, and where the method further includes: when the taint-source operation is resolved, clearing the stored taint. The method can also include based on the clearing the stored taint data, performing the taint-dependent operation. The method where the stored taint data associates a memory load operation associated with the taint-source operation with a physical register of the processor. The method where the stored taint data indicates the speculation-source operation. The method where the stored taint data indicates at least two operations dependent upon the taint-source operation. The method where: the performing the taint-source operation is responsive to predicting the conditional state to be generated by executing the speculation-source operation. The method further including: suppressing execution of the taint-dependent operation until the conditional state determining commitment of the taint-source operation is resolved. The method where the suppressing the at least one side effect of the taint-source operation includes at least one of: inhibiting fetch of the taint-source operation; inhibiting decode of the taint-source operation; inhibiting dispatch of the taint-source operation; inhibiting issue of the taint-source operation; inhibiting execution of the taint-source operation; inhibiting memory access of the taint-source operation; inhibiting register writeback of the taint-source operation, or inhibiting commitment of the taint-source operation. The method where: the speculation-source operation is at least one of: a control flow operation, a data flow operation, a branch operation, a predicated operation, a memory store address calculation, a memory consistency operation, a compound atomic operation, a flag control operation, a transactional operation, or an exception operation; and the taint-source operation is at least one of: a memory load operation, a memory store operation, a memory array read operation, a memory array write operation, a memory store forwarding operation, a memory load forwarding operation, a branch instruction (including relative branch and absolute jump, calls, and returns), a predicated instruction, an implied addressing mode operation, an immediate addressing mode operation, a register addressing mode memory operation, an indirect register addressing mode operation, an automatically indexed (e.g., an increment or decrement) addressing mode operation, a direct addressing mode operation, an indirect addressing mode operation, an indexed addressing mode operation, a register-based indexed addressing mode operation, a program counter relative addressing mode operation, or a base register addressing mode operation. The method where: the at least one side effect affects state of at least one of: a data cache of the processor, an instruction cache of the processor, a register read port of the processor, a register write port of the processor, a memory load port of the processor, a memory store port of the processor, symmetric multi-threading logic of the processor, a translation lookaside buffer of the processor, a vector processing unit of the processor, a branch target history table of the processor, or a branch target buffer of the processor. In some examples, a computer-readable storage medium stores computer-readable instructions that when executed by a computer, causes the computer to perform at least one of the disclosed methods. In some examples, a computer-readable storage medium stores computer-readable instructions that when executed by a computer, cause the computer to generate a design file for a circuit, the circuit, when manufactured using the design file, causing the processor to perform the method. Implementations of the described techniques may include hardware, a method or process, or computer software on a computer-accessible medium.

One general aspect includes an apparatus implementing a processor, the apparatus including: taint-matrix memory situated to store taint data for a taint-source operation when the taint-source operation is performed by the processor; and control logic that identifies the taint-source operation; stores the taint data in the taint-matrix memory, the taint indicating an operation dependent upon the identified taint-source operation and suppresses at least one side effect of the identified taint-source operation until conditional state determining commitment of the taint-source operation is resolved. Other embodiments of this aspect include corresponding computer systems, apparatus, and computer programs recorded on one or more computer storage devices, each configured to perform the actions of the methods.

Implementations may include one or more of the following features. The apparatus further including: control logic that clears taint data in the taint-matrix memory to indicate whether the identified taint-source operation has resolved. The apparatus can also include an execution unit that performs the taint-source operation, causing the at least one side effect. The apparatus can also include an execution unit that, based on the cleared taint data, performs the taint-dependent operation. The apparatus where: the taint data stored in the taint-matrix memory indicates a speculation-source instruction, which when executed, resolves the conditional state. The apparatus where: the taint data indicates at least two operations dependent upon the identified taint-source operation. The apparatus where: the taint data indicates that the taint-source operation is caused by executing a memory load instruction and the conditional state is determined by executing a branch instruction. The apparatus can also include the taint-source operation is caused by speculatively executing a memory load instruction and the conditional state is determined by executing a branch instruction. The apparatus where the apparatus further includes: a buffer storing instruction identifiers for the taint-source operation and zero or more additional taint-source operations. The apparatus can also include a load buffer storing instruction identifiers for memory load operations, respective entries of the taint data being associated with a respective one of the instruction identifiers stored in the load buffer. Implementations of the described techniques may include hardware, a method or process, or computer software on a computer-accessible medium.

In view of the many possible embodiments to which the principles of the disclosed subject matter may be applied, it should be recognized that the illustrated embodiments are only preferred examples and should not be taken as limiting the scope of the claims to those preferred examples. Rather, the scope of the claimed subject matter is defined by the following claims. We therefore claim as our invention all that comes within the scope of these claims.

What is claimed is:

1. A method of operating a processor, the method comprising:
   responsive to identifying a taint-source operation by the processor, storing taint data for the taint-source operation in a memory indicating an operation dependent upon the taint-source operation;
   storing instruction identifiers for the taint-source operation and zero or more additional taint-source operations in a buffer;
   storing an instruction identifier for at least one memory load operation in a load buffer, respective entries of the stored taint data being associated with a respective instruction identifier in the load buffer; and
   suppressing at least one side effect of the taint-source operation until conditional state determining commitment of the taint-source operation is resolved.

2. The method of claim 1, wherein the stored taint data indicates that the taint-source operation has not resolved, and wherein the method further comprises:
   when the taint-source operation is resolved, clearing the stored taint data; and
   based on the clearing the stored taint data, performing the taint-dependent operation.

3. The method of claim 1, wherein the stored taint data associates a memory load operation associated with the taint-source operation with a physical register of the processor.

4. The method of claim 1, wherein the stored taint data indicates the speculation-source operation.

5. The method of claim 1, wherein the stored taint data indicates at least two operations dependent upon the taint-source operation.

6. The method of claim 1, wherein:
   the performing the taint-source operation is responsive to predicting the conditional state to be generated by executing the speculation-source operation.

7. The method of claim 1, further comprising:
   suppressing execution of the taint-dependent operation until the conditional state determining commitment of the taint-source operation is resolved.

8. The method of claim 1, wherein the suppressing the at least one side effect of the taint-source operation comprises at least one of: inhibiting fetch of the taint-source operation; inhibiting decode of the taint-source operation; inhibiting dispatch of the taint-source operation; inhibiting issue of the taint-source operation; inhibiting execution of the taint-source operation; inhibiting memory access of the taint-source operation; inhibiting register writeback of the taint-source operation, or inhibiting commitment of the taint-source operation.

9. The method of claim 1, wherein:
   the speculation-source operation is at least one of: a control flow operation, a data flow operation, a branch operation, a predicated operation, a memory store address calculation, a memory consistency operation, a compound atomic operation, a flag control operation, a transactional operation, or an exception operation; and
   the taint-source operation is at least one of: a memory load operation, a memory store operation, a memory array read operation, a memory array write operation, a memory store forwarding operation, a memory load forwarding operation, a branch instruction (including relative branch and absolute jump, calls, and returns), a predicated instruction, an implied addressing mode operation, an immediate addressing mode operation, a register addressing mode memory operation, an indirect register addressing mode operation, an automatically indexed (e.g., an increment or decrement) addressing mode operation, a direct addressing mode operation, an indirect addressing mode operation, an indexed addressing mode operation, a register-based indexed addressing mode operation, a program counter relative addressing mode operation, or a base register addressing mode operation.

10. The method of claim 1, wherein:
the at least one side effect affects state of at least one of: a data cache of the processor, an instruction cache of the processor, a register read port of the processor, a register write port of the processor, a memory load port of the processor, a memory store port of the processor, symmetric multi-threading logic of the processor, a translation lookaside buffer of the processor, a vector processing unit of the processor, a branch target history table of the processor, or a branch target buffer of the processor.

11. A computer-readable memory or storage device storing computer-readable instructions that when executed by a computer, cause the computer to generate a design file for a circuit, the circuit, when manufactured using the design file, causing the processor to perform a method, the method comprising:
responsive to identifying a taint-source operation by the processor, storing taint data for the taint-source operation in a memory indicating an operation dependent upon the taint-source operation;
storing instruction identifiers for the taint-source operation and zero or more additional taint-source operations in a buffer;
storing an instruction identifier for at least one memory load operation in a load buffer, respective entries of the stored taint data being associated with a respective instruction identifier in the load buffer; and
suppressing at least one side effect of the taint-source operation until conditional state determining commitment of the taint-source operation is resolved.

12. The computer-readable memory or storage device of claim 11, wherein the stored taint data indicates that the taint-source operation has not resolved, and wherein the method further comprises:
when the taint-source operation is resolved, clearing the stored taint; and
based on the clearing the stored taint data, performing the taint-dependent operation.

13. The computer-readable memory or storage device of claim 11, wherein the stored taint data associates a memory load operation associated with the taint-source operation with a physical register of the processor.

14. The computer-readable memory or storage device of claim 11, wherein the stored taint data indicates at least two operations dependent upon the taint-source operation.

15. An apparatus implementing a processor, the apparatus comprising:
taint-matrix memory situated to store taint data for a taint-source operation when the taint-source operation is performed by the processor;
a buffer storing instruction identifiers for the taint-source operation and zero or more additional taint-source operations; and
a load buffer storing instruction identifiers for memory load operations, respective entries of the taint data being associated with a respective one of the instruction identifiers stored in the load buffer; and
control logic that:
identifies the taint-source operation,
stores the taint data in the taint-matrix memory, the taint data indicating an operation dependent upon the identified taint-source operation, and
suppresses at least one side effect of the identified taint-source operation until conditional state determining commitment of the taint-source operation is resolved.

16. The apparatus of claim 15, further comprising:
control logic that clears taint data in the taint-matrix memory to indicate whether the identified taint-source operation has resolved;
an execution unit that performs the taint-source operation, causing the at least one side effect; and
an execution unit that, based on the cleared taint data, performs the taint-dependent operation.

17. The apparatus of claim 15, wherein:
the taint data stored in the taint-matrix memory indicates a speculation-source instruction, which when executed, resolves the conditional state.

18. The apparatus of claim 15, wherein: the taint data indicates at least two operations dependent upon the identified taint-source operation.

19. The apparatus of claim 15, wherein:
the taint data indicates that the taint-source operation is caused by executing a memory load instruction and the conditional state is determined by executing a branch instruction; and
the taint-source operation is caused by speculatively executing a memory load instruction and the conditional state is determined by executing a branch instruction.

20. The apparatus of claim 15, wherein:
the control logic suppresses the at least one side effect responsive to the instruction identifiers stored in the buffer and the instruction identifiers stored in the load buffer.

21. An apparatus comprising:
means for a speculation tracking and remediation unit comprising:
means for identifying and monitoring speculation-source operations that can lead to taint-source operations using a speculative shadow buffer,
buffer means for storing an instruction identifier for the taint-source operation and zero or more additional taint-source operations, and
load buffer means for storing an instruction identifier for at least one memory load operation in a load buffer, respective entries of the stored taint data having a respective instruction identifier; and
the means for the speculation tracking and remediation unit causing the apparatus to perform:
a step for identifying a taint-source operation performed by a processor;
a step for storing a taint tag indicating a processor operation dependent upon the taint-source operation;
performing the taint-source operation, causing at least one side effect; and
a step for suppressing the at least one side effect of the taint-source operation until conditional state of the taint-source operation is resolved using the buffer means and the load buffer means.

22. The apparatus of claim 21, wherein the means for the speculation tracking and remediation unit further comprises:
speculative shadow buffer means for storing indicators of instructions in an instruction reorder buffer (ROB) that have been identified as sources of speculation; and
load queue means for storing identifiers for memory load instructions associated with the sources of speculation.

* * * * *